US008156348B2

(12) United States Patent
Tani

(10) Patent No.: US 8,156,348 B2
(45) Date of Patent: Apr. 10, 2012

(54) POWER CONTROLLER IN INFORMATION PROCESSOR

(75) Inventor: Takenobu Tani, Kyoto (JP)

(73) Assignee: Panasonic Corporation, Osaka (JP)

( * ) Notice: Subject to any disclaimer, the term of this patent is extended or adjusted under 35 U.S.C. 154(b) by 1140 days.

(21) Appl. No.: 11/919,421

(22) PCT Filed: Mar. 28, 2006

(86) PCT No.: PCT/JP2006/306274
§ 371 (c)(1),
(2), (4) Date: Oct. 26, 2007

(87) PCT Pub. No.: WO2006/117950
PCT Pub. Date: Nov. 9, 2006

(65) Prior Publication Data
US 2009/0313490 A1    Dec. 17, 2009

(30) Foreign Application Priority Data

Apr. 27, 2005    (JP) .................................. 2005-130433

(51) Int. Cl.
*G06F 1/26* (2006.01)
(52) U.S. Cl. ...................................................... 713/300
(58) Field of Classification Search .................. 713/320, 713/300
See application file for complete search history.

(56) References Cited

U.S. PATENT DOCUMENTS

| 6,519,706 | B1  |   | 2/2003  | Ogoro                    |
|-----------|-----|---|---------|--------------------------|
| 6,834,354 | B1  | * | 12/2004 | Togawa ............ 713/320 |
| 7,111,177 | B1  | * | 9/2006  | Chauvel et al. ..... 713/300 |
| 7,185,215 | B2  | * | 2/2007  | Cook et al. ......... 713/320 |
| 7,609,171 | B2  | * | 10/2009 | Haapoja et al. ..... 340/870.39 |
| 7,836,446 | B2  | * | 11/2010 | Ode .................. 718/100 |
| 2002/0073348 | A1 |   | 6/2002  | Tani                     |

FOREIGN PATENT DOCUMENTS

| EP | 0 794 481 A2 | 9/1997 |
| JP | 08-006681 | 1/1996 |
| JP | 08-152945 | 6/1996 |
| JP | 9-297688 | 11/1997 |
| JP | 09-297688 | 11/1997 |
| JP | 2001-290568 | 10/2001 |
| JP | 2002-182807 | 6/2002 |
| JP | 2003-202935 | 7/2003 |

OTHER PUBLICATIONS

Chinese Office Action issued in Chinese Patent Application No. CN 2006800141889, mailed Oct. 10, 2008.
Japanese Decision to Dismiss the Amendment, w/ English translation thereof, issued in Japanese Patent Application No. JP 2007-514509 dated Jan. 11, 2011.

* cited by examiner

*Primary Examiner* — Kim Huynh
*Assistant Examiner* — Eric Chang
(74) *Attorney, Agent, or Firm* — McDermott Will & Emery LLP

(57) ABSTRACT

A power controller (100) is for controlling power consumed in an information processor (1000) and includes a power context storing means (ZA105), a power context reference means (ZB101), and a power status changing means (ZA101). The power context storing means (ZA105) stores power control information for individual programs on a per program basis in storage regions distinguished with program identification information. The power context reference means (ZB101) references the power control information for the desired program in the power context storing means (ZA105). The power status changing means (ZA101) changes the status of the power consumed in the information processor (1000) based on the power control information referenced by the power context reference means (ZB101).

2 Claims, 34 Drawing Sheets

Voltage Control Device

Clock Control Device

| Processor No.0 | Power Source Group 0 |
| Processor No.1 | Power Source Group 1 |
| Processor No.2 | Power Source Group 2 |
| Processor No.3 | Power Source Group 0 |

(b)

| | Processor No.3 | Processor No.2 | Processor No.1 | Processor No.0 |
|---|---|---|---|---|
| Power Source Group No.0 | 1 | 0 | 0 | 1 |
| Power Source Group No.1 | 0 | 0 | 1 | 0 |
| Power Source Group No.2 | 0 | 1 | 0 | 0 |
| Power Source Group No.3 | 0 | 0 | 0 | 0 |

FIG.30
(a)
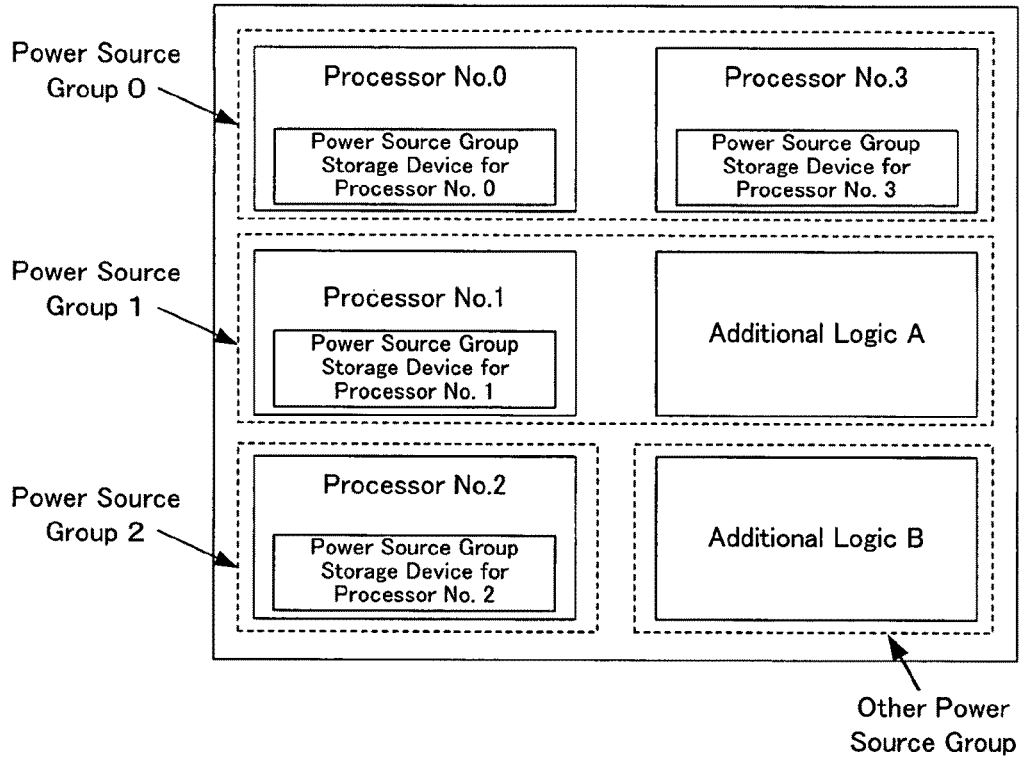
(b)
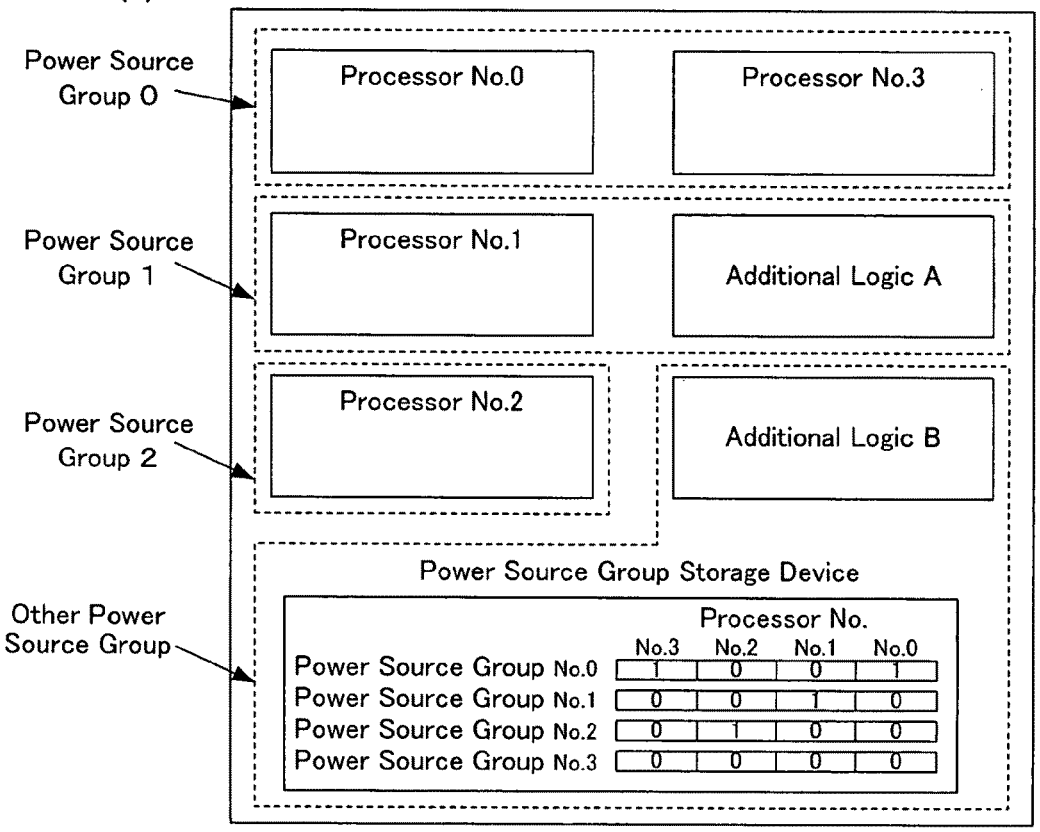

FIG.31

POWER CONTROLLER IN INFORMATION PROCESSOR

RELATED APPLICATIONS

This application is the U.S. National Phase under 35 U.S.C. §371 of International Application No. PCT/JP2006/306274, filed on Mar. 28, 2006, which in turn claims the benefit of Japanese Application No. 2005-130433, filed on Apr. 27, 2005, the disclosures of which Applications are incorporated by reference herein.

TECHNICAL FIELD

The present invention relates to a power controller in an information processor. Examples of the information processor mentioned above include a microprocessor (such as a microcomputer, a microcontroller, or a digital signal processor) composed of a single or plurality of structures, a sequencer, a static configurational logic, and a dynamic reconfigurable logic. Although the processor is mainly used as an example in the present specification, the present invention is applicable to the foregoing information processors in general.

BACKGROUND ART

In recent years, in digital equipment such as a cellular phone or digital television, demand for various digital processing such as sound processing, audio processing, video processing, and code processing has grown. To implement the digital processing, an information processor such as a microprocessor is used normally. To respond to an increase in demand for applications, a circuit scale, an operation frequency, and the number of mounted processors have also increased so that power consumption has kept on increasing.

To reduce power consumption, control operations have been performed conventionally and generally, such as clock gating control using hardware, a control operation which suspends an operationally unneeded block using software, and a control operation (Japanese Laid-Open Patent Publication No. HEI 8-152945) which changes a frequency and a voltage status on a per program basis using software or hardware. It is assumed herein that the expression "a per program basis" in the specification implies a per process basis, a per thread basis, and a per task basis.

In recent years, there has also been performed a control operation which changes a frequency and a voltage status depending on an average load state over a long cycle period in the status of execution of a processor (Japanese Laid-Open Patent Publication No. HEI 8-6681).

Patent Document 1: Japanese Laid-Open Patent Publication No. HEI 8-152945
Patent Document 2: Japanese Laid-Open Patent Publication No. HEI 8-6681

DISCLOSURE OF THE INVENTION

Problems to be Solved by the Invention

However, the conventional method of reducing power consumption on a per program basis does not allow efficient power saving in a system in which a plurality of programs operate simultaneously in parallel or concurrently with temporal switching therebetween.

For example, the problem of a system which causes two programs to concurrently operate in a single physical processor, while effecting temporal switching therebetween, is as follows. When program switching frequently occurs under conditions that one of the programs requires an operation at a high power source voltage and the other program requires an operation at a low power source voltage, it may be considered that, with the conventional method of changing a power source voltage on a per program basis, a change in power source voltage cannot keep up with program switching timing. In this case, a waiting time for the completion of the change in power source voltage occurs, but the waiting time presents a fatal problem causing the degradation of the system performance and damage to the performance guarantee in an embedded application which places emphasis on real-time properties. Therefore, in such an application, it is actually impossible to use simple program-wise power control. The same holds true not only for a change in power source voltage but also for a change in clock frequency. FIGS. 32 and 33 respectively show an ideal change in power status (which is a voltage in this example) and a change in power status involving an actual transition time.

On the other hand, even when a change in power source voltage and a change in clock frequency can assumedly keep up with a program switching frequency, in a system which causes a large number of programs to operate in parallel or concurrently, the program-wise power control cannot necessarily achieve reduced power consumption by supplying voltages such as an optimum power source voltage and a threshold voltage during the execution of the whole set of programs. For example, a consideration will be given to the case where, in a system causing four programs to concurrently operate, two of the programs operate at a high voltage and the other two programs operate at a low voltage. In this case, a program execution process with highest power efficiency is implemented by sustaining a pattern in which the two programs at a high voltage are consecutively executed and then the other two programs at a low voltage are consecutively executed. However, the power control method focusing attention on a program as a unit of control has the high possibility that programs with high voltage settings and programs with low voltage settings are alternatively executed. In this case, a power loss resulting from a change in voltage status occurs more frequently or a waiting operation for a change in voltage status is performed a larger number of times so that an optimum status in terms of power consumption and system performance is not reached. FIGS. 34 and 35 respectively show the transition process of efficient scheduling and the transition process of inefficient scheduling in terms of power consumption.

To solve the problems described above, a method can be considered which changes a supplied voltage and an operation frequency in accordance with an average load state over a relatively long cycle period (in the order of, e.g., milliseconds) instead of performing program-wise power saving. In this case, since power control is performed over a longer cycle period, it is impossible to perform efficient power control which changes a power condition in a shorter time suitably for real-timing processing involving frequent program switching. In addition, because the power control is irrelevant to the order in which the programs are executed, the programs need not necessarily be executed in an optimum order, as shown above, and the power consumption of the whole set of programs is not necessarily optimal. Moreover, because the power control is based on the previous average information, a preliminary power change cannot be performed. Although it is possible to change power based on an expectation using the ramp function of the average information, even when there is a program which will be definitely executed in future, it is impossible to preliminarily change the power to a proper power status in accordance with the program.

Although the problem of the conventional power control during the execution of the plurality of programs on the single physical processor has been shown above, even in a system having a plurality of physical processors, it is similarly impossible to efficiently reduce the power consumption of the whole set of programs with the conventional power control method based on the program-wise property.

For example, even when there are two physical processors and the power of each of the processors is controllable, relations among the order in which software items are executed, the processors on which the software items are executed, and a change in power status are not necessarily most efficient.

By way of example, a consideration will be given to the case where there are processors A and B, programs PH1 and PH2 each requiring a high operation voltage, and programs PL1 and PL2 each sufficient with a low operation voltage. When it is assumed that each of the processors A and B initiates operation at a high voltage, it is impossible with the power control method using only a program as a unit of control to judge optimum program allocation and optimum power control. The power efficiency of the entire system is highest when one of the processors A and B is caused to execute the programs PL1 and PL2 at the low operation voltages. However, when program allocation is performed at a voltage closest to, e.g., the current voltage, the programs PH1 and PH2 are allocated to the processors A and B and then the programs PL1 and PL2 are allocated to the processors A and B. As a result, the power status changes twice so that the optimum state shown above is not reached. The same holds true for the case where the programs PL1 and PL2 are allocated to the respective processors A and B prior to the programs PH1 and PH2. Thus, as long as the power control is performed on a per program basis, power saving considering the entire system cannot be performed sufficiently.

Means for Solving the Problems

A power controller according to the present invention is a power controller for controlling power consumed in an information processor, the power controller comprising: a power context storing means for storing power control information for individual programs on a per program basis in storage regions distinguished with program identification information; a power context reference means for referencing the power control information for the desired program in the power context storing means; and a power status changing means for changing a status of the power consumed in the information processor based on the power control information referenced by the power context reference means.

Preferably, the power controller described above further comprises: a power control register for storing the power control information on the program currently being executed in the information processor, wherein the power context reference means includes a power context save/restore control means for saving or restoring a content of the power control register in or from the power context storing means in parallel with execution of an instruction in the information processor and the power status changing means changes the status of the power consumed in the information processor based on the power control information stored in the power control register. With the arrangement, even in a system which processes the plurality of programs while effecting frequent switching therebetween, it is possible to save and restore the power control information without degrading program processing performance and perform more attentive and efficient power control.

In the power controller described above, the power context reference means preferably includes a power context preliminary reference means for referencing the power control information for the first program different from the program currently being executed in the information processor when the first program is not executed. With the arrangement, even in a system which executes the plurality of programs, it is possible to preliminarily perform a process for changing the power status and a scheduling process for program allocation prior to the allocation and execution of the corresponding program and implement power control without degrading program processing performance.

In the power controller described above, the power status changing means preferably preliminarily changes the power status based on the power control information for the first program referenced by the power context preliminary reference means prior to execution of the first program. With the arrangement, it is possible to more promptly change the processor to a power status in which the first program is executable and suppress performance degradation due to a waiting operation for a change in power status.

In the power controller described above, the power context preferably preliminary reference means references the power control information corresponding to the first program prior to execution of the first program and prohibits a change in power status upon judging that the change in power status is not valid based on information on a time required for the change in power status and a program allocation period. With the arrangement, it is possible to efficiently suppress performance degradation due to a mismatch between the processor status and the power control status.

In the power controller described above, the power control information preferably includes a hit rate or a miss rate of previous power allocation and the power context reference means preferably includes a speculative power status change determining means for determining whether or not the power status is to be changed when the corresponding program is executed based on the hit rate or miss rate of the power control information. With the arrangement, it is possible to efficiently suppress performance degradation due to a mismatch between the processor status and the power control status.

In the power controller described above, the power context reference means preferably includes a program scheduling means for selecting a program which causes a minimum power change in the current power status from the power control information stored in the power context storing means on a per program basis and allocating the selected program to the information processor. With the arrangement, it is possible to efficiently reduce total power consumption during the execution of the plurality of programs.

In the power controller described above, the power context reference means preferably includes a program scheduling means for rearranging the programs in an order which minimizes power changes between the individual programs based on the power control information stored in the power context storing means on a per program basis and allocating the rearranged programs to the information processor. With the arrangement, it is possible to efficiently reduce total power consumption during the execution of the plurality of programs.

Preferably, the power controller described above further comprises: a load detecting means for detecting a current operating state of the information processor; a power status detecting means for detecting a current power status of the information processor; a load power determining means for preliminarily judging that an operation of the current program cannot be continued from a load detected by the load detecting means and from power information detected by the power status detecting means; and a program scheduling means for effecting switching between the programs when the operation of the current program cannot be continued. With the arrangement, it is possible to suppress performance degradation due to the waiting operation for a change in power status and simultaneously perform a more positive control operation for a power status change because of reduced power degradation.

Another power controller according to the present invention is a power controller for controlling power consumed in a plurality of physical processors, the power controller comprising: a power source group storing means for storing information for identifying a group of power sources to which the physical processors physically belong; and a program scheduling means for determining the physical processors to which the individual programs are to be allocated based on a content of the power source group storing means. With the arrangement, it is possible to efficiently reduce total power consumption during the execution of the plurality of programs in the system having the plurality of physical processors without depending on the number of the processors mounted thereon.

Effect of the Invention

Thus, in an information processing system which executes a plurality of programs concurrently or in parallel, the present invention allows a more efficient reduction in power consumption during the execution of the whole set of programs, while minimizing degradation of the processing performance of the system.

BRIEF DESCRIPTION OF THE DRAWINGS

FIGS. 29(a) and 29(b) are views showing examples of a logic structure of a power source group storage device;

FIGS. 30(a) and 30(b) are views showing examples of physical layout of a processor and the power source group storage device;

FIGS. 31(a) and 30(b) are views showing examples of program allocation for heat distribution;

DESCRIPTION OF NUMERALS

Figure 1:
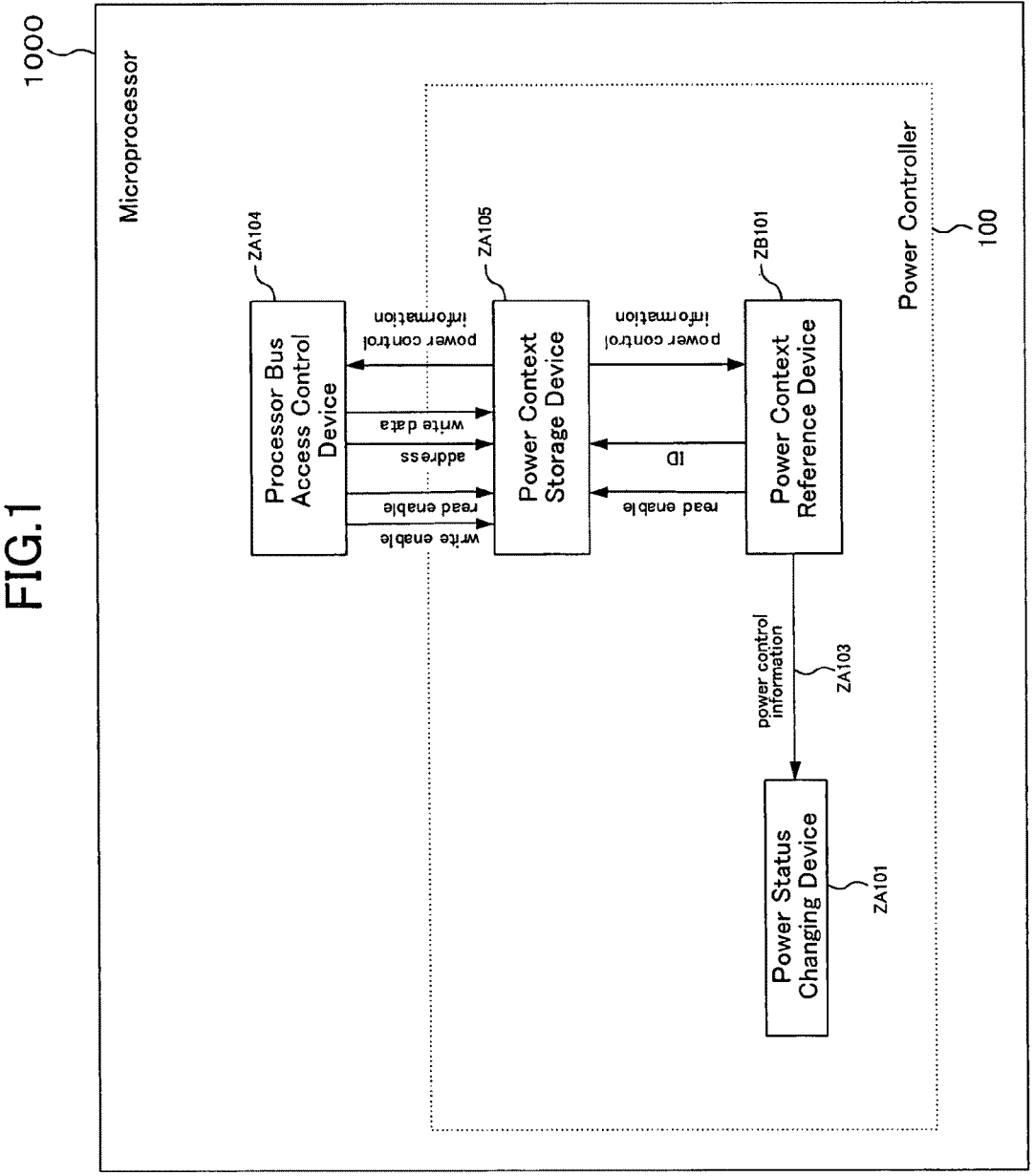
FIG. 1 is a block diagram showing a structure of a power controller according to a first embodiment of the present invention.

ZA101 Power Status Changing Device
ZA102 Power Control Register
ZA103 Power Control Information
ZA104 Processor Bus Access Control Device
ZA105 Power Context Storage Device
ZA106 Power Contest Save/Restore Control Device
ZB101 Power Context Reference Device
ZC101 Power Preliminary Control Device
ZD101 Speculative Power Status Changing Device
ZF101 Power Scheduler
ZF103 Program Allocation Device
ZH101 Load Power Determining Device
ZI101 Power Group Storage Device

BEST MODE FOR CARRYING OUT THE INVENTION

Referring to the drawings, the embodiments of the present invention will be described hereinbelow in detail. In the drawings, the same or equivalent portions are designated by the same reference numerals, and a description thereof will not be repeated.

In the following embodiments, examples of the application of the present invention particularly to a microprocessor as an information processor will be described.

First Embodiment

FIG. 1 is a block diagram showing a structure of a power controller 100 according to the first embodiment. Although FIG. 1 shows the case where the power controller 100 is provided inside a microprocessor 1000 (information processor), it is also possible to provide the power controller 100 outside the microprocessor 1000 (information processor).

A power context storage device ZA105 is connected to a processor bus access control device ZA104 and capable of performing a read/write operation from the microprocessor 1000. The power context storage device ZA105 is also connected to a power context reference device ZB101 to output power control information ZA103 in accordance with an identification number requested from a power context reference device ZB101 to the power context reference device ZB101.

A power status changing device ZA101 changes the power status of the microprocessor 1000 based on the power control information ZA103 supplied from the power context reference device ZB101 to reduce power consumption.

Although the power context reference device ZB101 accesses the power context storage device ZA105 in parallel with a processor bus access control device ZA104 in the structure shown in FIG. 1, it is also possible to adopt a structure in which the power context reference device ZB101 accesses the power context storage device ZA105 via the processor bus access control device ZA104.

Unlike a second embodiment (FIG. 7) which will be described later, the present invention does not necessarily require a power control register ZA102 (FIG. 7) showing power control information only for a current program and controls the power status changing device ZA101 based on the information in the power context storage device ZA105.

In the power context storage device ZA105, the power contexts of a set of programs executed in a single or plurality of physical processors are stored. By preliminarily referencing these power contexts and performing calculation as necessary, an effective reduction in the power consumption of the entire system is enabled.

It will be easily understood that the power context storage device ZA105 can be composed of a SRAM structure or of a set of flip-flops. It is also possible to place the power context storage device ZA105 in shared relation with information other than power information in a memory space accessible by the microprocessor 1000.

Figure 2:
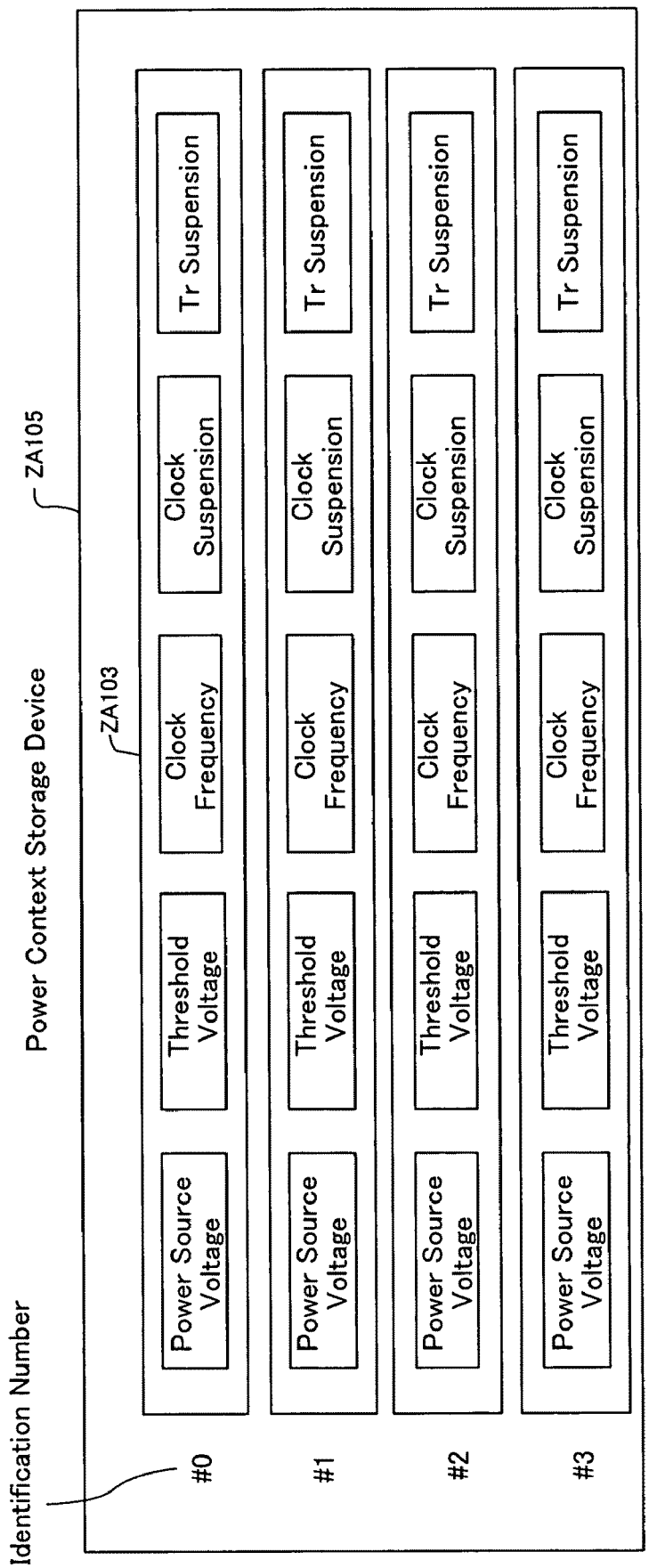
FIG. 2 is a view showing an example of a logic structure of a power context storage device.

FIG. 2 shows an example of a structure of the power context storage device ZA105. To store the power control information ZA103 for individual programs on a per program basis, the power context storage device ZA105 is composed of storage regions for the power control information ZA103 in accordance with the identification numbers (IDs) for identifying the programs.

For example, when the power context storage device ZA105 is constructed by using a SRAM (Static Random Access Memory), it is possible to perform not only the reading of the power control information ZA103 but also the writing thereof.

Figure 3:
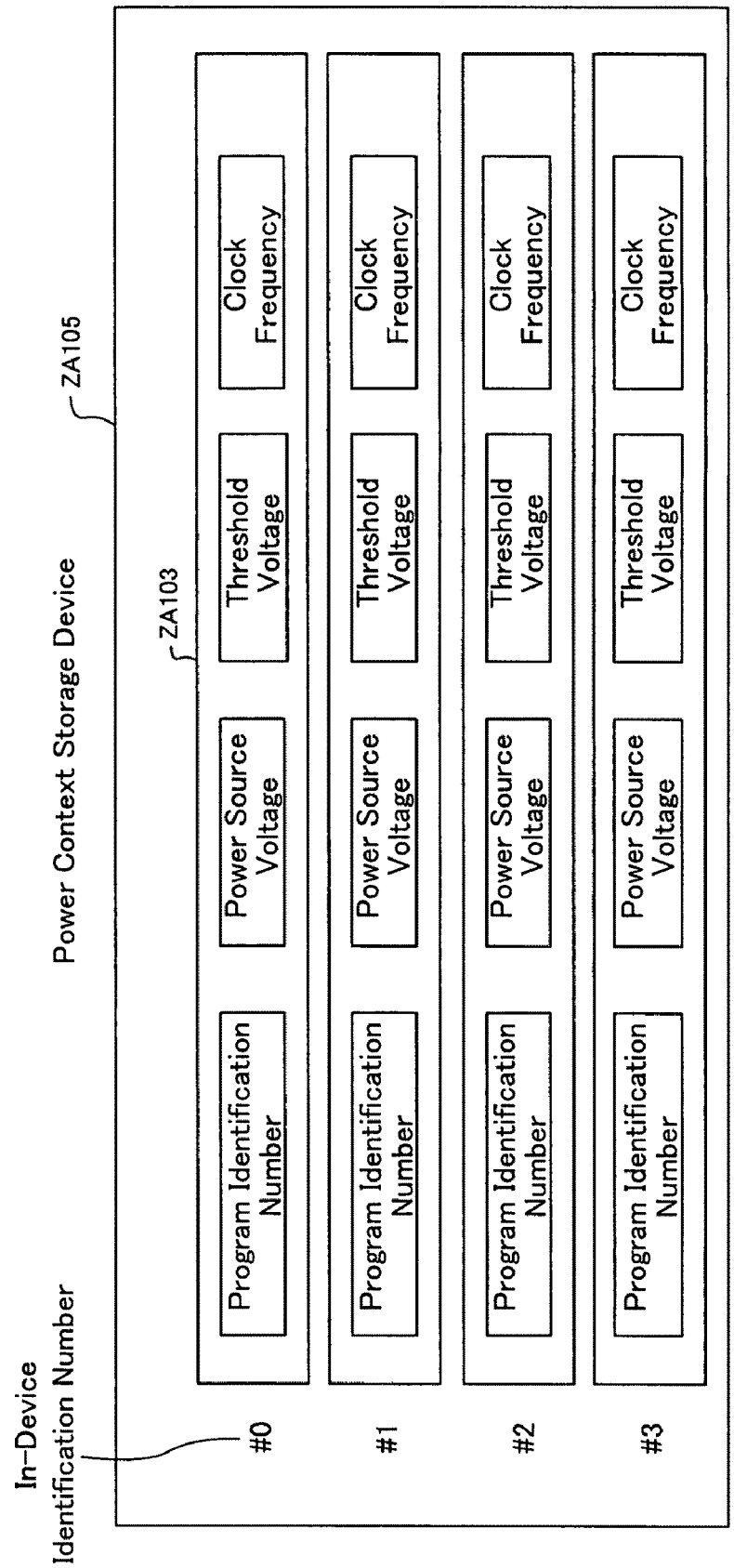
FIG. 3 is a view showing another example of the logic structure of the power context storage device.

FIG. 3 shows another example in which the respective identification numbers (IDs) of the programs are also stored as the power control information ZA103 in the power context storage device ZA105.

Figure 4:
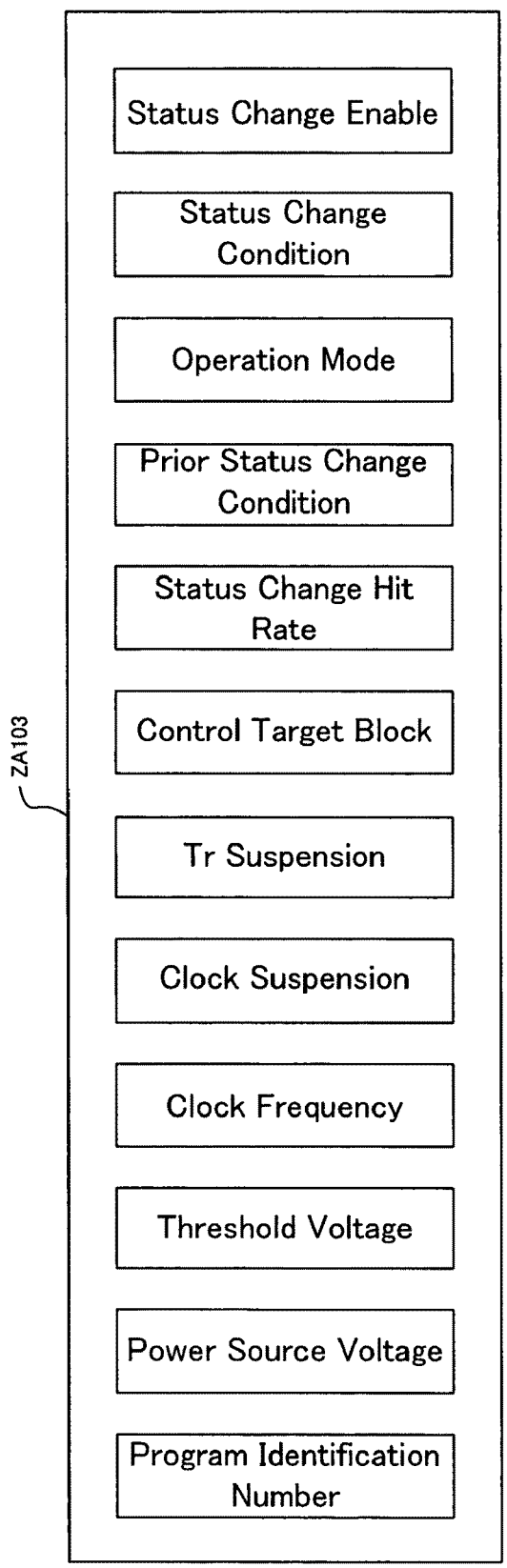
FIG. 4 is a view showing an example of a logic structure of power control information.

FIG. 4 shows an example of the content of the power control information ZA103. However, the power control information ZA103 need not necessarily include all the items, and another item other than the content shown in FIG. 4 can naturally be stored.

In FIG. 4, power voltage information shows, e.g., a voltage for power supply to the information processor, which is used in a control operation for saving power during the operation of the information processor.

Threshold voltage information is used in a control operation for reducing a leakage current in the information processor using an extremely fine semiconductor process.

Clock frequency information shows the frequency of a clock supplied to the information processor and, by varying the frequency, a power reduction is achieved.

Clock suspension information is used in a control operation for reducing unnecessary power consumption by suspending a clock supply to an operationally unneeded circuit region.

Tr suspension information is used in a control operation for suspending an output Tr to suppress the toggling of an operationally unneeded signal or in a control operation for suspending Tr for a power gating element, which is inserted in series in a MOS circuit to reduce leakage power.

Control target block information is used to specify a target block for which power control shown by the power control information ZA103 is to be performed.

Status change hit rate information is used to perform power control based on the previous hit rate of speculative power status changes, as will be described later.

Prior status change condition information specifies an activation condition for changing a power status prior to the initiation of the corresponding program, as will be described later.

Operation mode information indicates a mode number specifying a voltage and a frequency. For example, the mode numbers are used to identify a high-speed operation mode in which the information processor operates at a high voltage and a high frequency and a low-speed mode in which the information processor operates at a low voltage and a low frequency, thus reducing an amount of information and facilitating the setting of power.

Status change condition information specifies a condition for the status of the information processor for allowing the corresponding program to perform a power change. For example, the status change condition information specifies address information, a priority level status, a memory access status such as a cache mistake, or the like during the execution of the corresponding program and activates a power change only in the event of a match.

Status change enable information shows whether the corresponding program is enabled or disabled to perform a power change.

Figure 5:
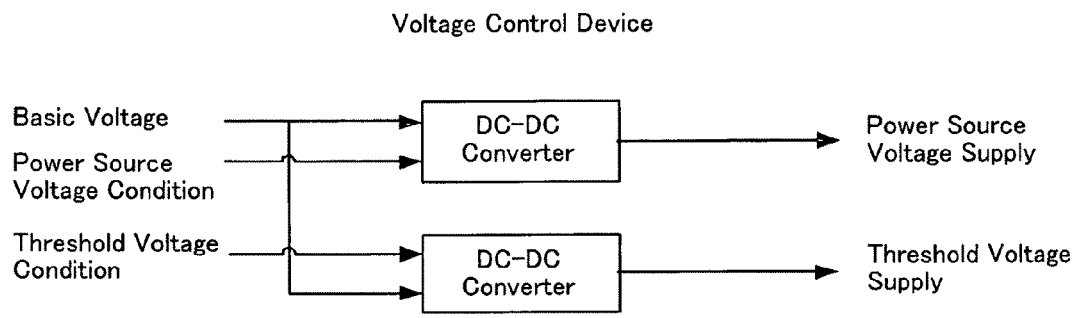
FIG. 5 is view showing an example of a detailed structure of a power status changing device.
Figure 6:
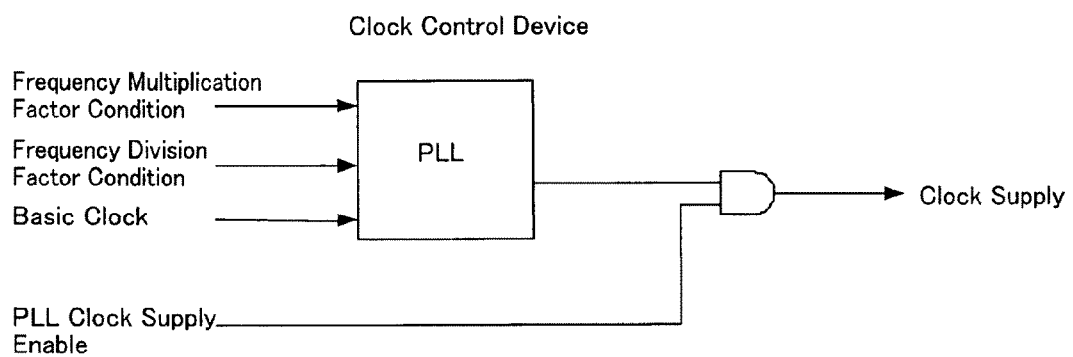
FIG. 6 is a view showing another example of the detailed structure of the power status changing device.

FIGS. 5 and 6 show an example of the power status changing device ZA101. FIG. 5 shows an example which changes a supplied voltage using a DC-DC converter under the conditions of a given power source voltage and a given threshold voltage. FIG. 6 shows an example which changes a supplied clock under the conditions of a frequency multiplication factor and a frequency division factor as clock frequency information.

Second Embodiment

Figure 7:
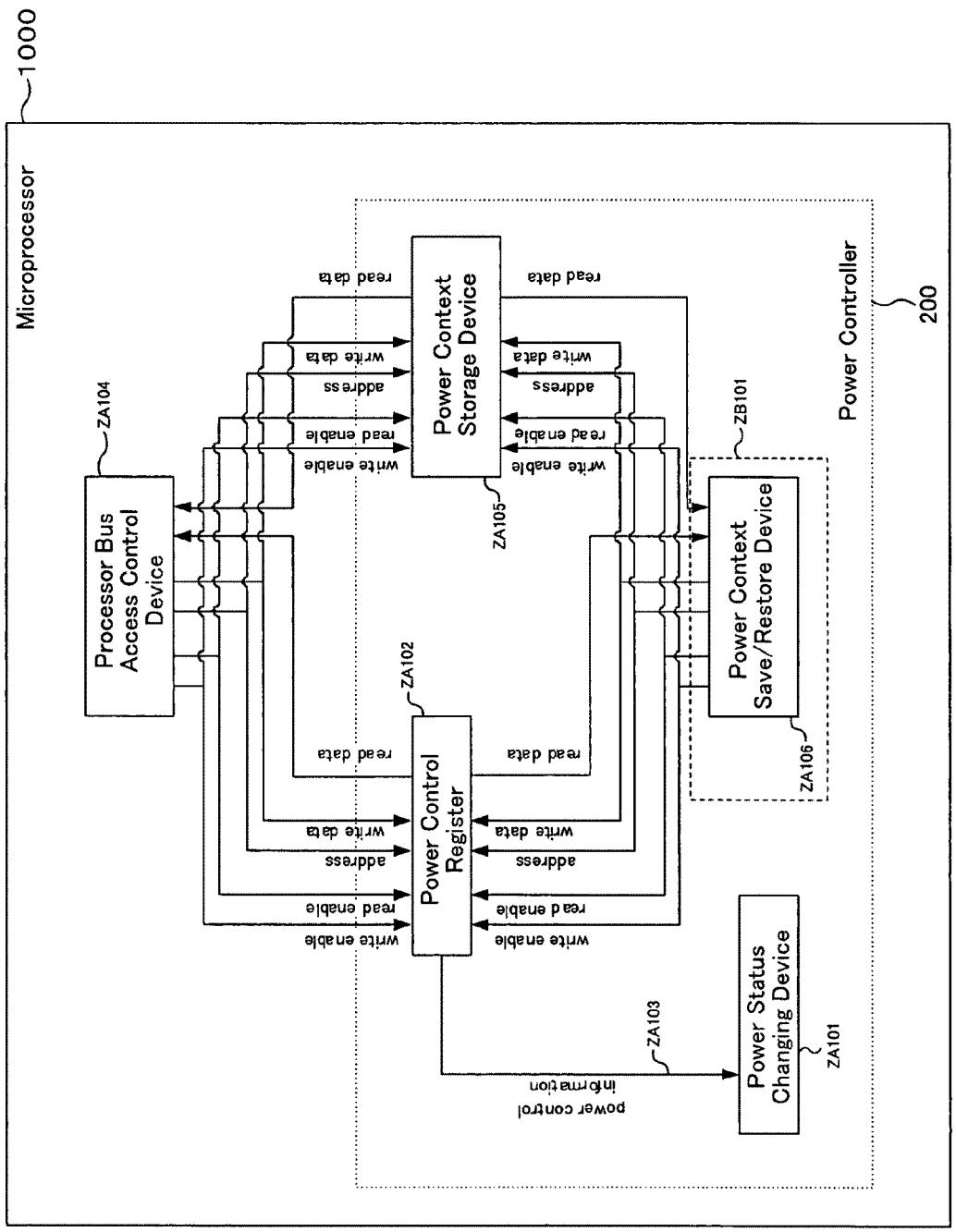
FIG. 7 is a block diagram showing a structure of a power controller according a second embodiment of the present invention.

FIG. 7 is a block diagram showing a structure of a power controller 200 according to the second embodiment. Although FIG. 7 shows the case where the power controller 200 is provided inside the microprocessor 1000, it is also possible to provide the power controller 200 outside the microprocessor 1000.

The power status changing device ZA101 is connected to the power control register ZA102 to change the power status of the microprocessor 1000 for a reduction in power consumption based on the content of the power control information ZA103 supplied from the power control register ZA102.

To the power control information ZA103 held by the power control register ZA102, read/write operations can be performed via the processor bus access control device ZA104 connected to the power control register ZA102. By rewriting the content of the power control register ZA102 with the program being executed by the microprocessor 1000, it is possible to change the microprocessor 1000 to a proper power status and reduce power consumption.

The microprocessor 1000 can perform a read/rewrite operation to the content of the power context storage device ZA105 via the processor bus access control device ZA104.

The program executed by the microprocessor 1000 can implement individual power control under different conditions on a per program basis by replacing the content of the power control register ZA102 with the contents of the storage regions of the power context storage device ZA105, which are prepared for the individual programs in a one-to-one correspondence.

By preparing the power control information for the individual programs on a per program basis, it becomes possible to perform more attentive power control and a more effective reduction in power consumption.

It will be easily understood that the power context storage device ZA105 can be composed of a SRAM structure or of a set of flip-flops. It is also possible to place the power context storage device ZA105 in shared relation with information other than the power information in a memory space accessible by the microprocessor 1000.

The power context reference device ZB101 includes a power context save/restore control device ZA106. The power context save/restore control device ZA106 is connected to the power control register ZA102 and to the power context storage device ZA105 and can perform read/rewrite operations with respect to the respective memory contents thereof. Because the power context save/restore control device ZA106 can access the power control register ZA102 and the power context storage device ZA105 without occupying processor buses, it is possible to replace the respective contents of the power control register ZA102 and the power context storage device ZA105 without degrading the processing performance of the processor.

Third Embodiment

Figure 8:
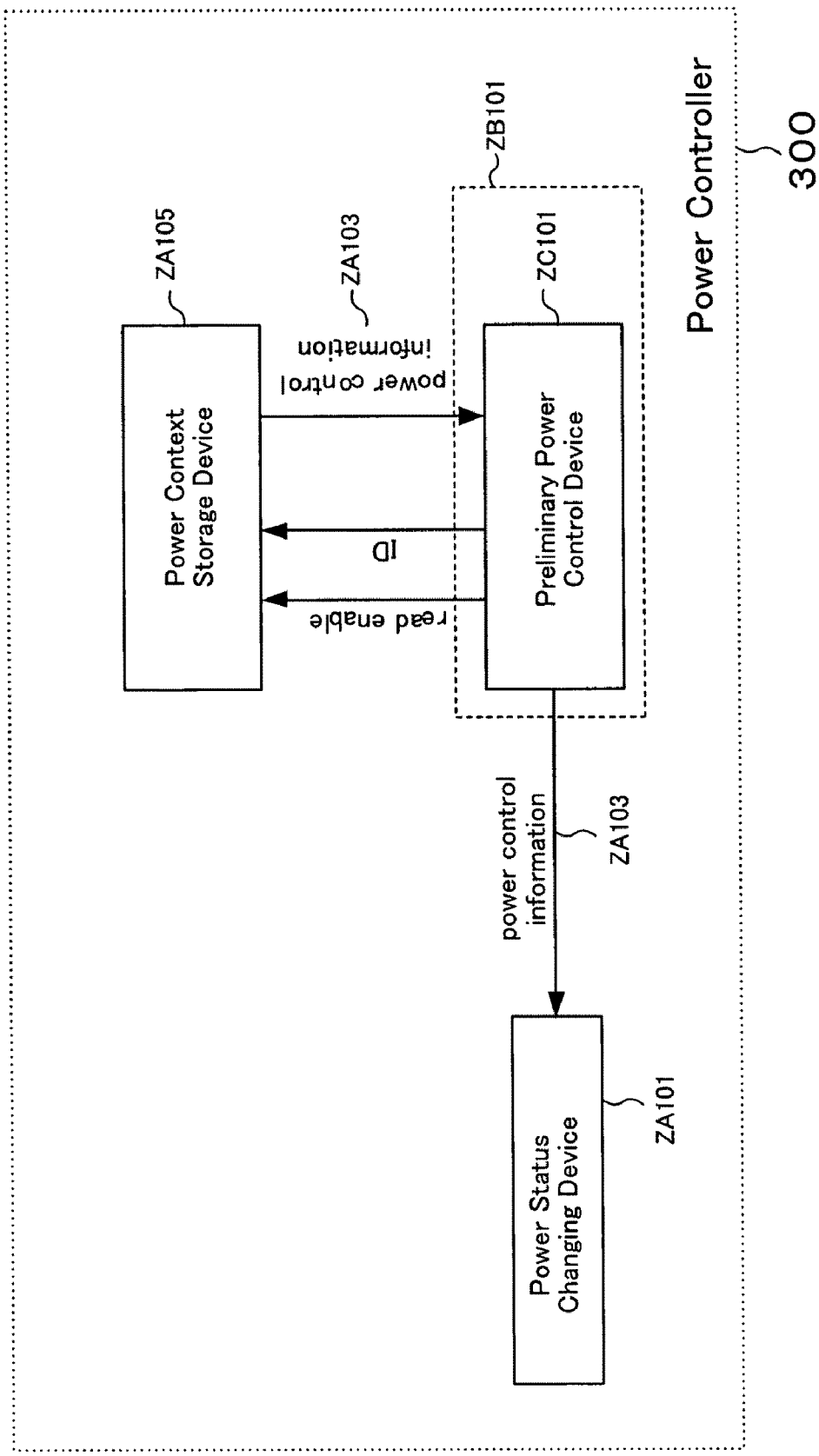
FIG. 8 is a block diagram showing a structure of a power controller according a third embodiment of the present invention.

FIG. 8 is a block diagram showing a structure of a power controller 300 according to the third embodiment. The power controller 300 may be provided either inside the microprocessor 1000 or outside the microprocessor 1000, similarly to the power controllers 100 and 200 shown in FIGS. 1 and 7.

The power context reference device ZB101 includes a power preliminary control device ZC101. The power preliminary control device ZC101 acquires the power control information ZA103 from the power context storage device ZA105, performs calculation for changing the power status based thereon, and supplies the power control information ZA103 to the power status changing device ZA101.

The power status changing device ZA101 changes the power status of the microprocessor 1000 based on the power control information ZA103 supplied thereto.

Figure 9:
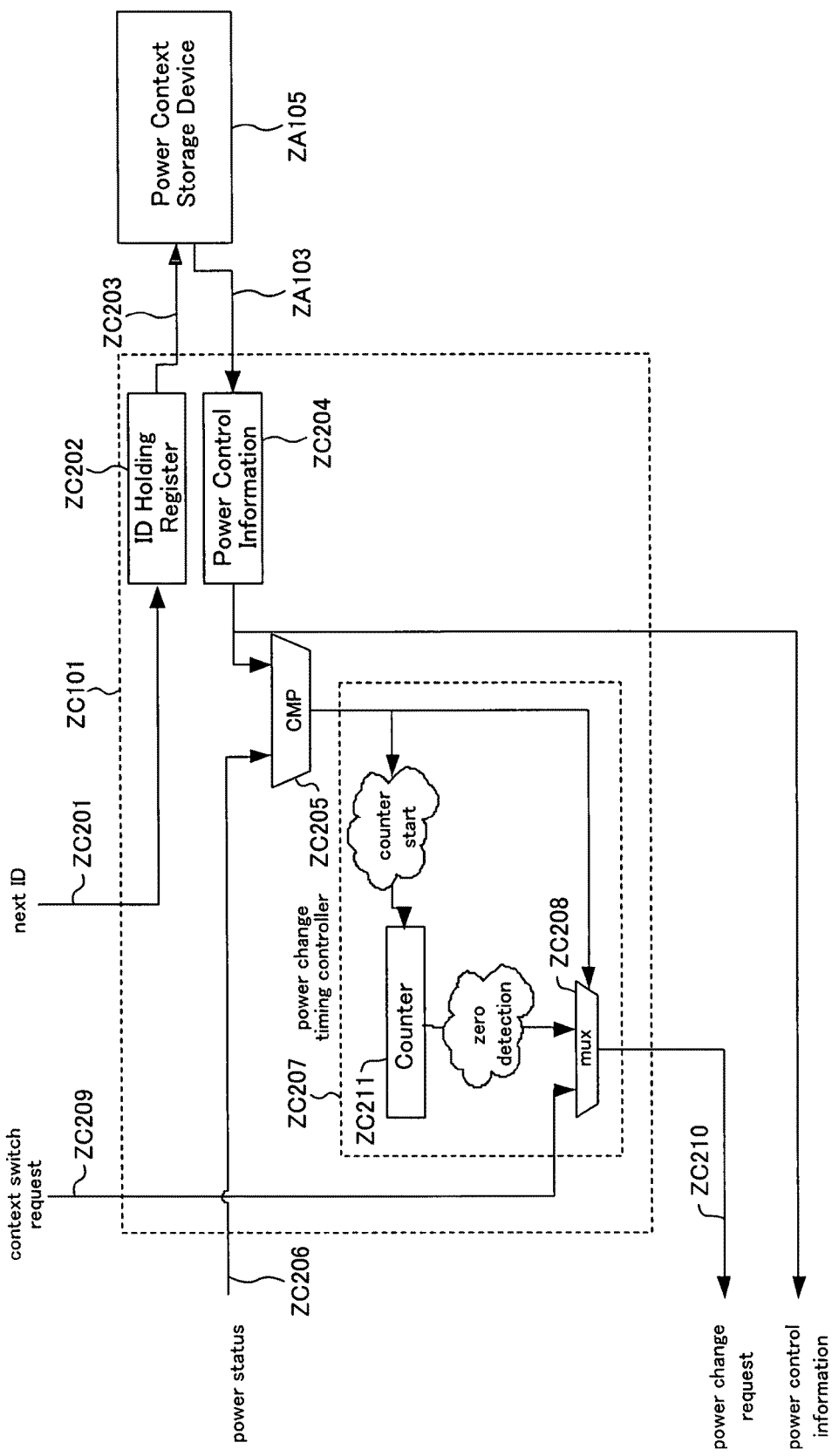
FIG. 9 is a view showing an example of a detailed structure of a power preliminary control device.

FIG. 9 shows an example of the internal structure of the power preliminary control device ZC101.

The power preliminary control device ZC101 receives the identification number ZC201 of a program to be subsequently executed by the microprocessor 1000 from a program scheduler using hardware or a program scheduler using an operating system and stores the received identification number ZC201 in an identification number holding register ZC202.

The content of the identification number holding register ZC202 is supplied as an identification number ZC203 to the power context storage device ZA105. From the power context storage device ZA105, the power control information ZA103 corresponding to the identification number ZC203 is acquired and recorded in a power control information holding register ZC204.

A comparator ZC205 makes a comparison between the power status ZC206 of the microprocessor 1000 and the content of the power control information ZA103 and reports the result of the comparison to a power change timing controller ZC207. It is assumed herein that, by way of example, the power status ZC206 and the power control information ZA103 show power source voltages.

As a result of the comparison between the power status ZC206 and the power control information ZA103, when the voltage shown by the power status ZC206 is higher, a selector ZC208 selects a program switch request ZC209 from the program scheduler. That is, after awaiting a timing with which the program is switched, a voltage status change request ZC210 is issued to the power status changing device ZA101. This prevents the misoperation of the microprocessor 1000 resulting from a status change to a voltage not higher than operable voltages during the execution of a program requiring a high operation voltage.

When the result of the comparison from the comparator ZC205 shows that the power status ZC206 is lower, the power change timing controller ZC207 starts preparations for a power change before program switching. In this example, a down counter ZC211 is activated and when the result of the activation reaches a predetermined value (which is zero in this example), the voltage status change request ZC210 is issued to the power status changing device ZA101. As a result, it is possible to make a change to the power status required by the corresponding program before switching to the corresponding program.

Figure 10:
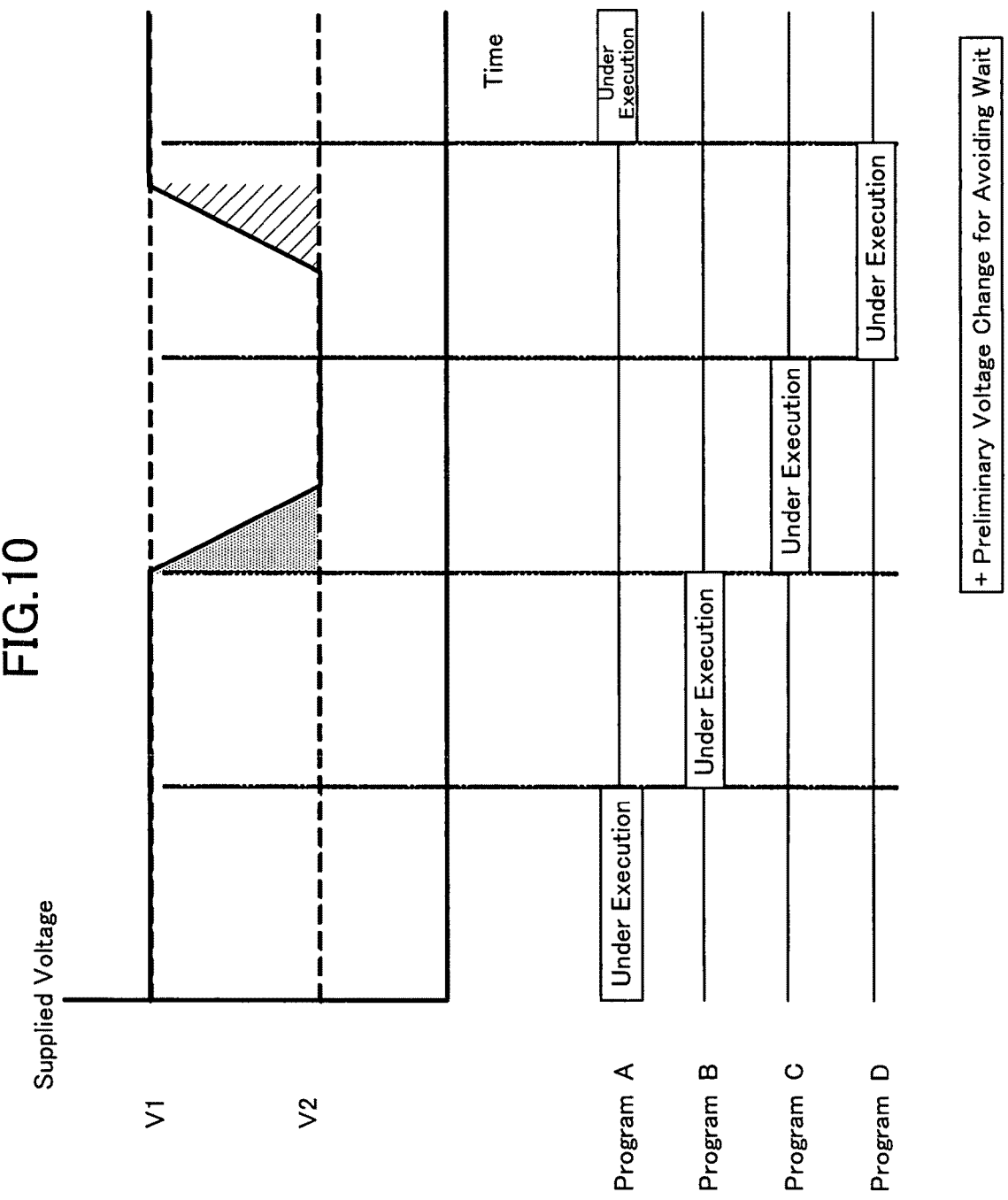
FIG. 10 is a view showing operation timings for the power controller according to the third embodiment.

FIG. 10 shows operation timings in the present embodiment. By way of example, the case is shown herein where programs A and B specify a voltage V1 as the power control information ZA103 and programs C and D specify a voltage V2 as the power control information.

During the execution of the program B, the power status ZC206 is the voltage V1 and the power control information ZA103 of the program C shows the voltage V2. As a result of making a comparison between the power status ZC206 and the power control information ZA103, the comparator ZC205 judges that the power status ZC206 is higher and causes the selector ZC208 to select the program switch request ZC209. Because the program switch request ZC209 is asserted upon program switching, the power switch request ZC210 is not issued until the program switching. As a result, a change in power status is awaited till the timing with which the execution of the program B is interrupted.

Conversely, during the execution of the program D, the comparator ZC205 judges that the power control information ZA103 is higher as a result of making a comparison. As a result, after counting by the counter, the power change timing controller ZC207 initiates a change in power status prior to program switching.

When the power condition is the same as during the execution of the next program, in the same manner as during the execution of the programs A and C, the power status is the same whether a power change is performed before or after program switching. It could naturally be assumed that power change control is not performed when the result of the comparison is the same.

Figure 11:
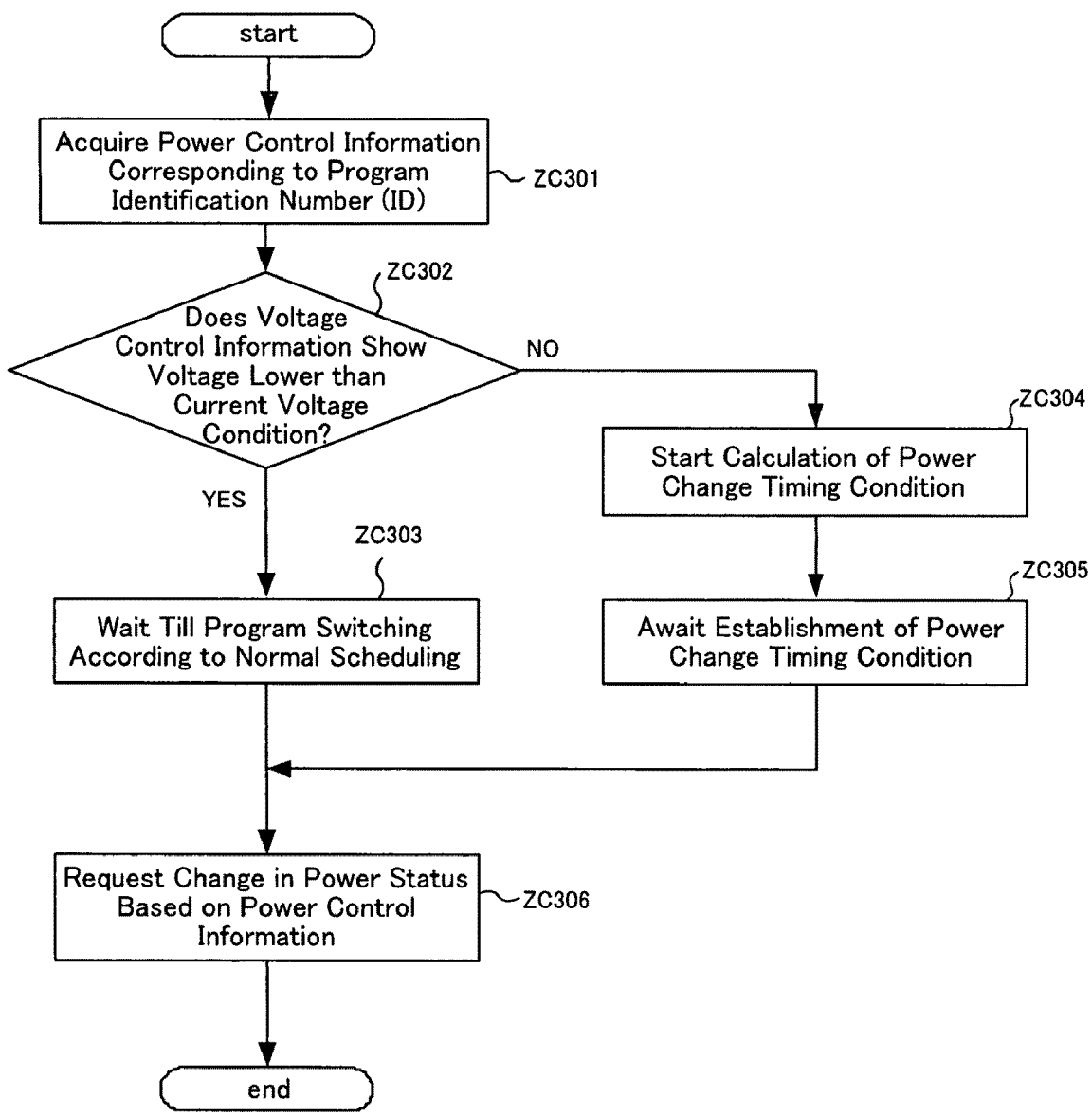
FIG. 11 is a flow chart for illustrating operation procedures of the power controller according to the third embodiment.

FIG. 11 shows an example of procedures performed in the present embodiment.

In the procedure ZC301, the power control information ZA103 in accordance with the identification number of the program to be subsequently allocated is acquired.

Next, in the procedure ZC302, a comparison is made between the power control information ZA103 and the power status ZC206 of the microprocessor 1000. In this example assuming the voltage as the power status, a procedure ZC303 is selected when the power status ZC206 is lower and a procedure ZC304 is selected when the power status ZC206 is higher.

In the procedure ZC303, a power change is awaited till program switching according to normal scheduling.

In the procedure ZC304, the calculation of the timing for changing the power condition is initiated. In the present embodiment, an example of timing adjustment using the timer ZC211 is shown.

In the procedure ZC305, a power change is awaited till the timing condition is completed. In the present embodiment, it is shown as the condition that the count value of the timer ZC211 reaches a predetermined value.

In the procedure ZC306 after the completion of the waiting operation, a change in power status is requested of the power status changing device ZA101 based on the power control information ZA103.

Fourth Embodiment

Figure 12:
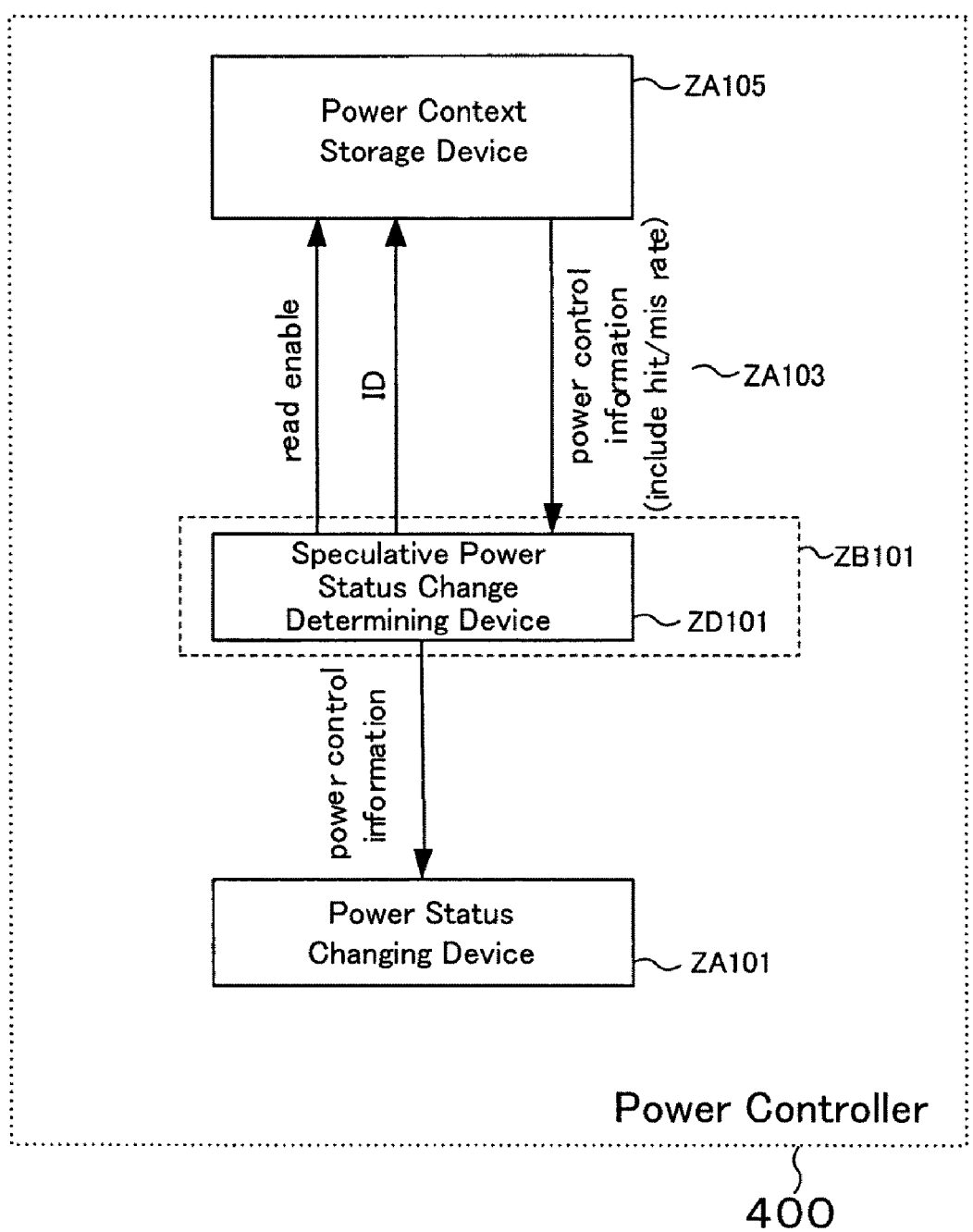
FIG. 12 is a block diagram showing a structure of a power controller according to a fourth embodiment of the present invention.

FIG. 12 is a block diagram showing a structure of a power controller 400 according to the fourth embodiment. The power controller 400 may be provided either inside the microprocessor 1000 or outside the microprocessor 1000, similarly to the power controllers 100 and 200 shown in FIGS. 1 and 7.

The power context reference device ZB101 includes a speculative power status changing device ZD101. The speculative power status changing device ZD101 acquires the power control information ZA103 from the power context storage device ZA105, performs calculation for a change in power status based thereon, and supplies the power control information ZA103 to the power status changing device ZA101.

The power status changing device ZA101 performs a power change for the microprocessor 1000 based on the supplied power control information ZA103.

Figure 13:
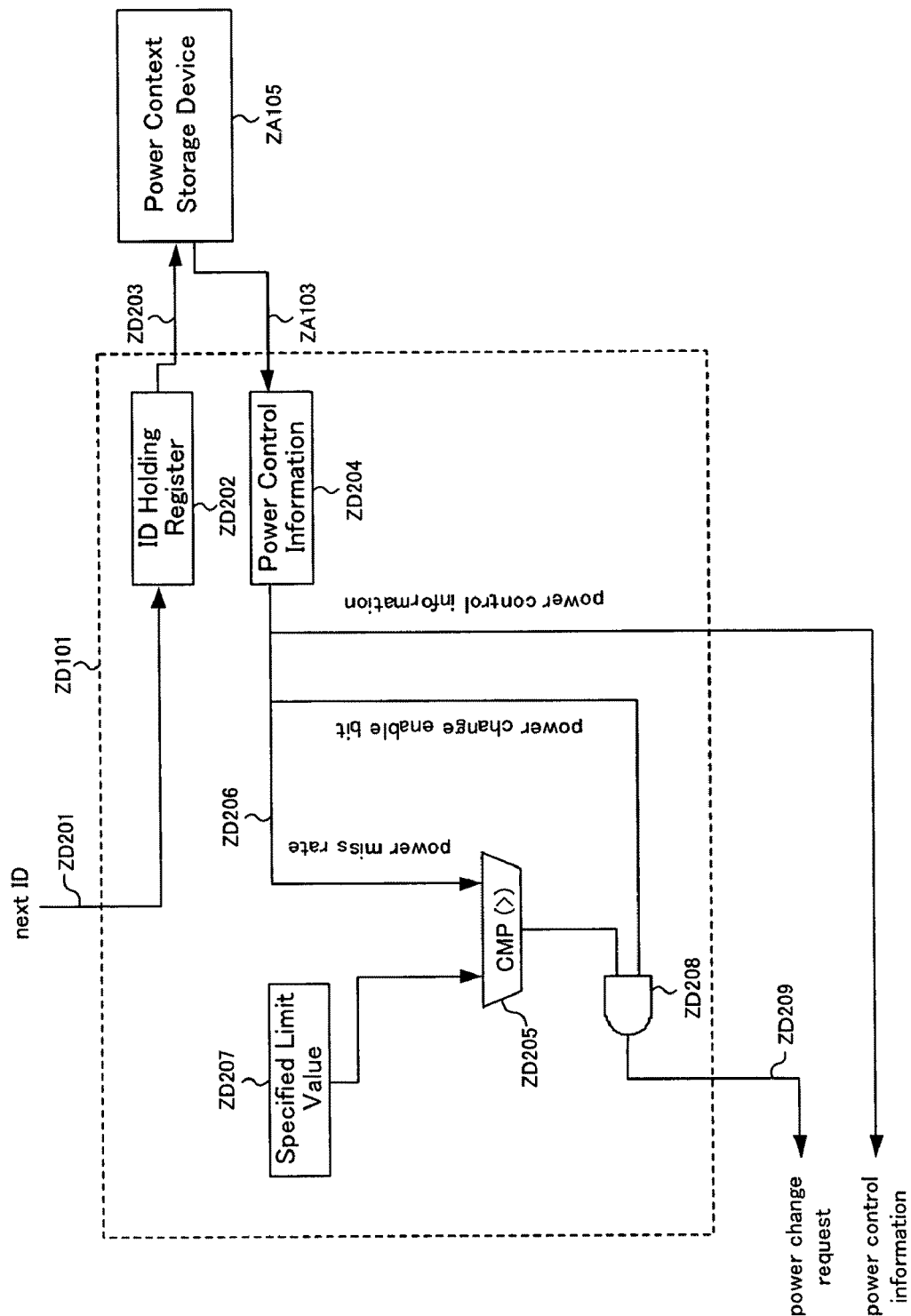
FIG. 13 is a view showing an example of a detailed structure of a speculative power status change determining device.

FIG. 13 shows an example of the internal structure of the speculative power status changing device ZD101.

The speculative power status changing device ZD101 receives an identification number ZD201 of a program to be subsequently executed by the microprocessor 1000 from a program scheduler using hardware or a program scheduler using an operating system and stores the received identification number ZD201 in an identification number holding register ZD202.

The content of the identification number holding register ZD202 is supplied as an identification number ZD203 to the power context storage device ZA105. From the power context storage device ZA105, the power control information ZA103 corresponding to the identification number ZD203 is acquired and recorded in a power control information holding register ZD204.

A comparator ZD205 makes a comparison between the previous hit rate ZD206 of power changes and a specified limit value ZD207 for the hit rate. For example, the previous hit rate ZD206 of power changes is composed of the number of consecutively missed power changes. When the specified limit value ZD207 is constituted to show three times, an output of the comparator ZD205 is asserted when the previous hit rate ZD206 is not more than three.

In this case, a logical AND between the output of the comparator ZD205 and a power change enable bit in the power control information ZD204 is calculated (ZD208), and the result thereof is issued as a power change request ZD209 to the power status changing device ZA101.

In this manner, it is possible to suppress a change in power status based on the previous hit rate of power changes when misses are not less than a given condition.

Figure 14:
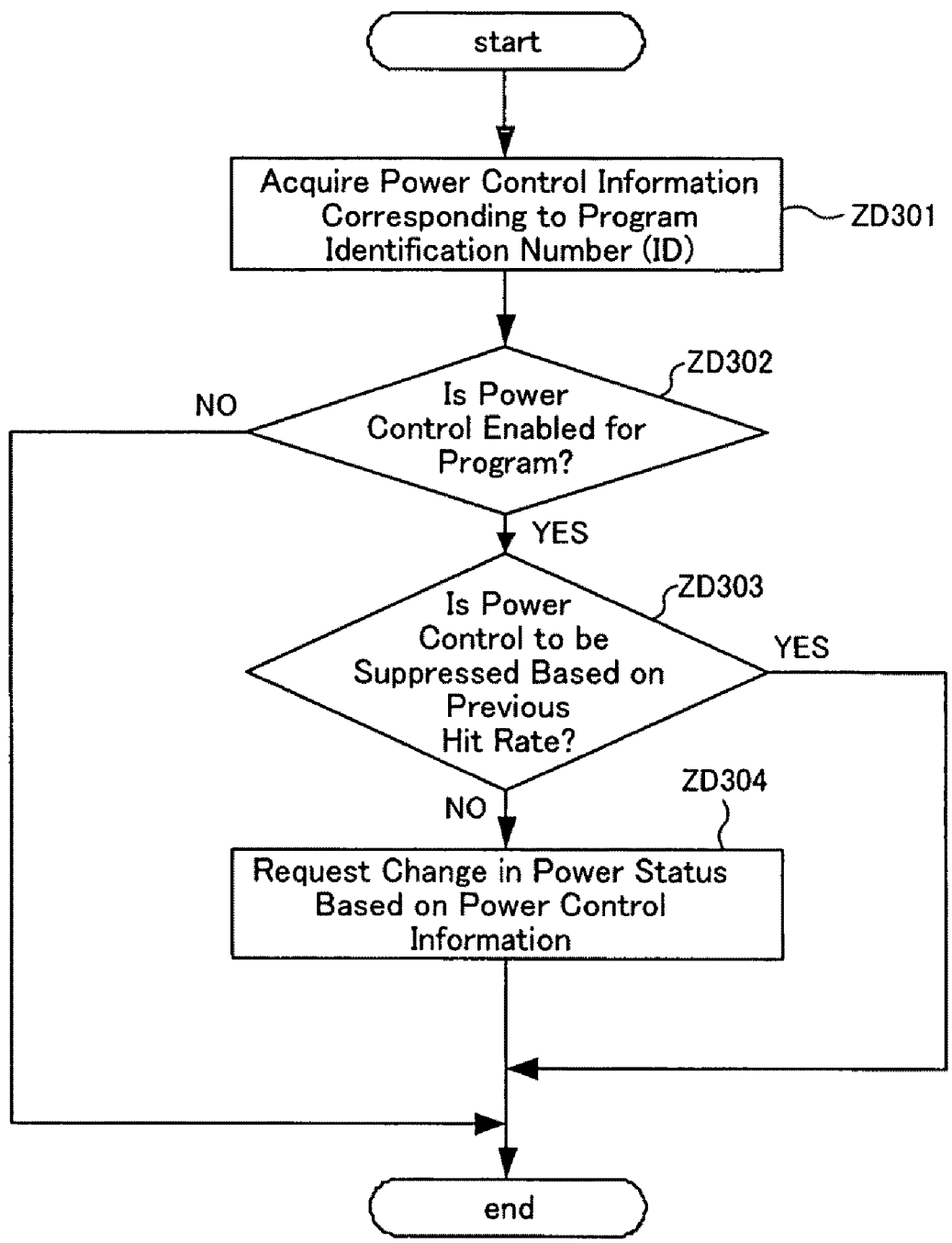
FIG. 14 is a flow chart for illustrating operation procedures of the power controller according to the fourth embodiment.

FIG. 14 shows an example of procedures performed in the present embodiment.

In the procedure ZD301, the power control information ZA103 in accordance with the identification number of the program to be subsequently allocated is acquired.

Next, in the procedure ZD302, it is determined whether or not power control is enabled for the program from the content of the status change enable bit in the power control information ZA103. When power control is not enabled for the program, the procedure is completed without issuing a request for a change in power status.

When it is determined that the power control is enabled, it is determined next in the procedure ZD303 whether a control operation for changing the power status is to be performed or suppressed from the previous hit rate of power status changes in the content of the power control information. When it is determined that the control operation is to be suppressed, the procedure is completed without issuing a request for a change in power status. Conversely, when it is determined that a change is to be made, a request for a change in power status is issued in the procedure ZD304 to the power status changing device ZA101 based on the content of the power control information ZA103.

Figure 15:
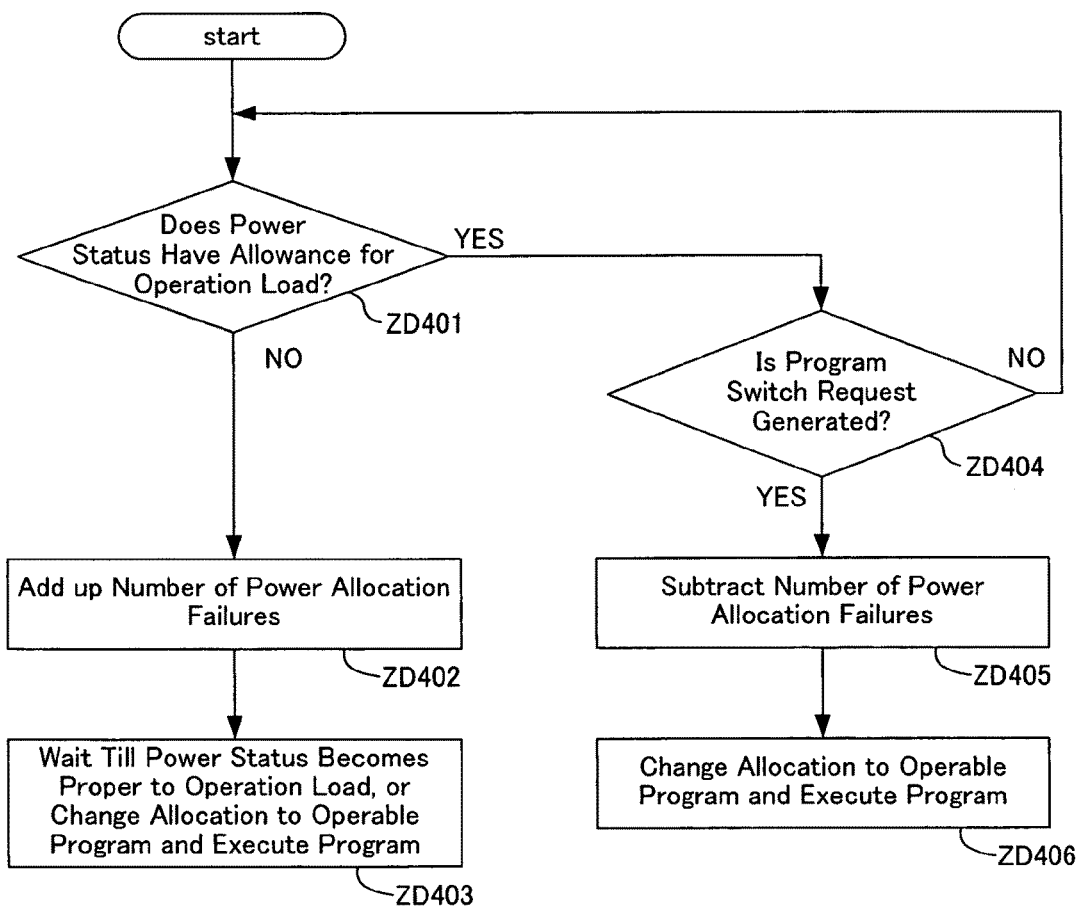
FIG. 15 is a flow chart showing an example of procedures for calculating a previous hit rate.

FIG. 15 shows an example of the calculation of the previous hit rate in the present embodiment. Here is shown an example which performs calculation based on the number of misses to provide the hit rate.

In a procedure ZD401, it is determined by calculation based on the degree of allowance whether or not the current combination of the power status and the load status could cause the misoperation of the microprocessor 1000 (this procedure will be shown in the eighth embodiment).

When it is determined in the procedure ZD401 that the power status has no allowance (power hazard status), a value corresponding to the status change hit rate in the power control information is increased in a procedure ZD402. In a simple example, the value is increased by one upon each detection of the power hazard status, but a method which adds a value weighted in accordance with the degree of allowance can also be easily implemented.

In a procedure ZD403, a method is adopted which brings the request for a power status change into a waiting status till the power status has allowance or switches to an allocatable program, depending on a mounting method.

When it is determined that the power status has allowance in the procedure ZD401 and a program switch request is further received in a procedure ZD404, the calculation of the hit rate is further performed in a subsequent procedure ZD405.

As a mounting method in the procedure ZD405, there is one which simply subtracts a value. In this method, the hit rate can be calculated depending on whether or not the total value exceeds a certain threshold value irrespective of the degree of consecutiveness of misses or hits.

As another mounting method, a method can be adopted in the procedure ZD405 which clears the value of the hit rate to an initial value (e.g., 0) when the power allocation is successful. In this case, a method can be implemented which determines that the total value is over the threshold value only when the number of consecutive misses is N.

Figure 16:
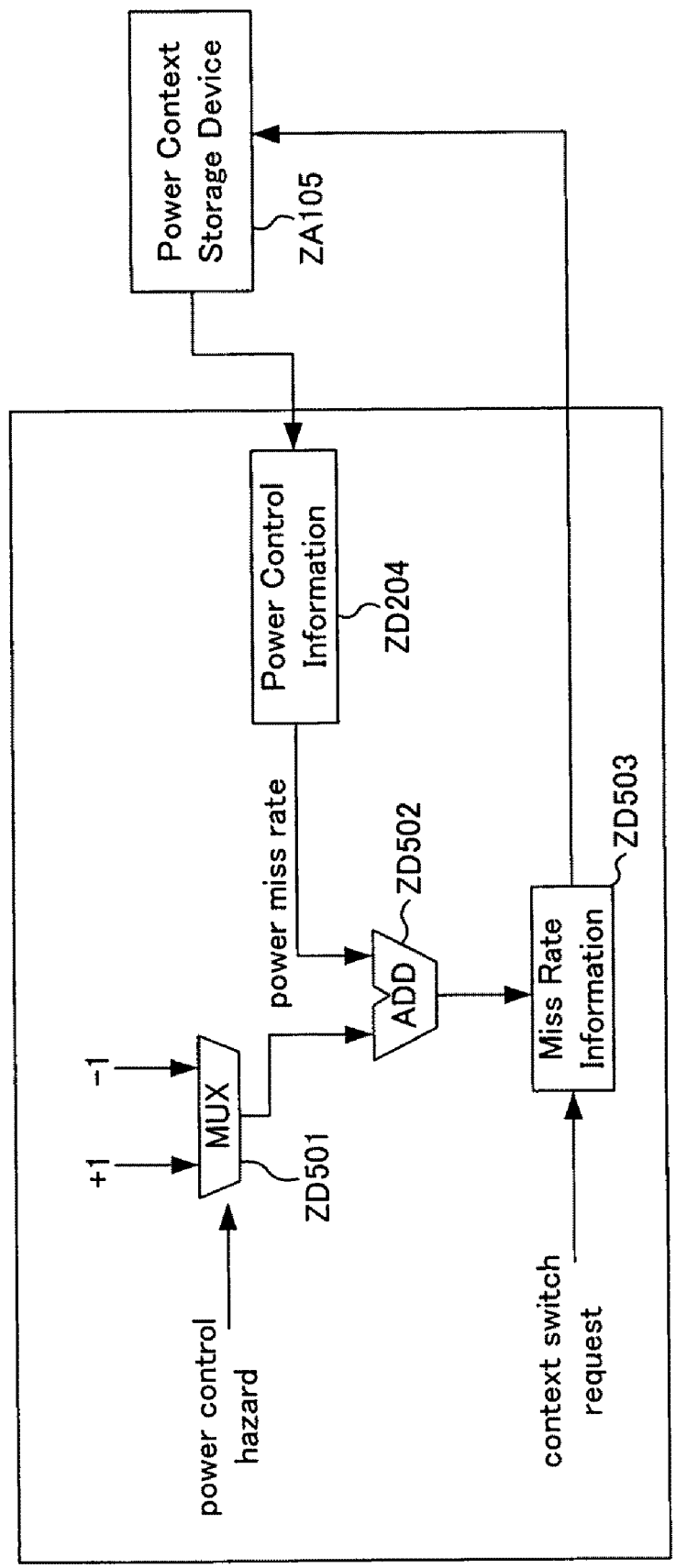
FIG. 16 is a block diagram showing a structure of a device for calculating the hit rate.

FIG. 16 is a block diagram showing a structure of a device for calculating the hit rate.

In this example, a selector ZD501 supplies a value (+1), which is a miss number addition value, in the event of the power hazard status. When the current status is not the power hazard status, the selector ZD501 supplies a value (−1), which is a hit number subtraction value.

An adder ZD502 adds up the value of the current status change hit rate supplied from the power control information ZD204 and the addition/subtraction values supplied from the selector ZD501.

A miss rate information register ZD503 writes the value supplied from the adder ZD502 when program switch information is asserted. Further, the miss rate information register ZD503 uses the value to update the field of the status change hit rate in the power context storage device ZA105.

Figure 17:
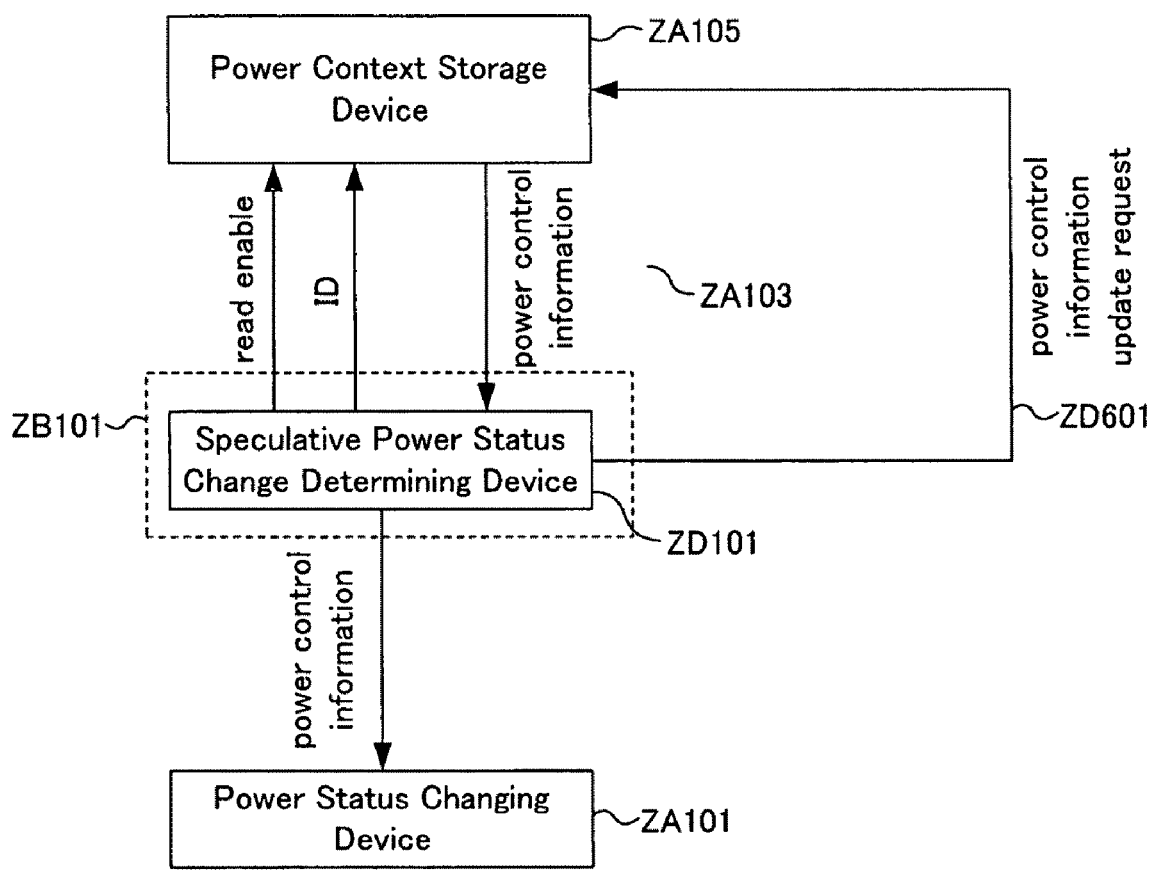
FIG. 17 is a block diagram showing an example of a structure of a device for updating information in a power context storage device with a value in accordance with the operating status of a program at the time of program switching.

By way of example, FIG. 17 shows a structure of a device for updating the information in the power context storage device ZA105 with a value in accordance with the operating status of the program upon program switching, as shown in the present embodiment.

Although the present embodiment has illustrated whether or not a power change is to be speculatively performed, a power reduction can be performed more safely by using a mechanism for determining a success or a failure in power allocation. For example, when power allocation is successful, it is possible to calculate the degree of allowance of the power status and update the power control information for the corresponding program in the power context storage device ZA105. For example, when power allocation is successful and it can be determined that the current voltage has sufficient allowance for the operating condition, it is possible to update the power control information in the power context storage device ZA105 with a lower voltage value. Conversely, when the degree of allowance is low, the power control information can be updated with a higher voltage value. This allows a reduction in performance degradation due to a failure in power allocation and dynamically achieves a reduction in power consumption.

Fifth Embodiment

Figure 18:
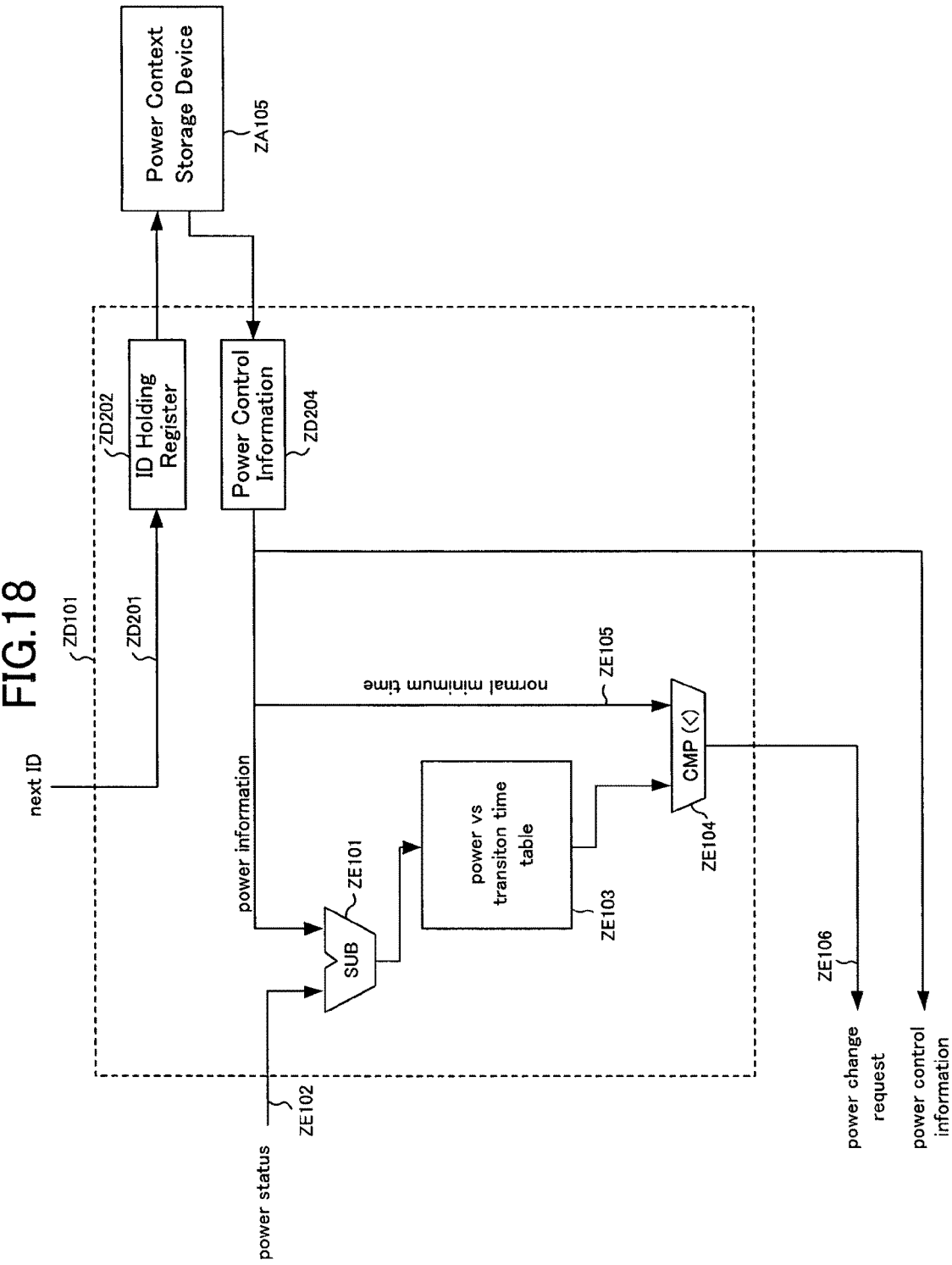
FIG. 18 is a view showing an example of a detailed structure of the speculative power status change determining device.

FIG. 18 shows another example of the internal structure of the speculative power status changing device ZD101.

The speculative power status changing device ZD101 receives an identification number ZD201 of a program to be subsequently executed by the microprocessor 1000 from a program scheduler using hardware or a program scheduler using an operating system and stores the received identification number ZD201 in the identification number holding register ZD202.

The content of the identification number holding register ZD202 is supplied as an identification number ZD203 to the power context storage device ZA105. From the power context storage device ZA105, the power control information ZA103 corresponding to the identification number ZD203 is acquired and recorded in a power control information holding register ZD204.

A differential calculator ZE101 calculates the difference between the power status ZE102 of the microprocessor 1000 and the power information in the power control information ZA103. As an example of the power status, a power source voltage is shown herein. In this case, the differential calculator ZE101 calculates the voltage difference therebetween and outputs the voltage difference. A power-transition time table ZE103 calculates a time required for a change in power status value inputted thereto and outputs the calculated time. For example, a transition time required for a change with a voltage difference of 0.1 mV is stored in the form of a table and outputted. It will be easily appreciated that the table may also be composed of a rewritable register or memory or of a combinational logic.

The comparator ZE104 makes a comparison between an output of the power-transition time table ZE103 and a normal minimum time ZE105 in the content of the power control information ZA103 and, when the normal minimum time ZE105 is smaller, the comparator ZE104 issues a power change request ZE106 to the power status changing device ZE101.

The normal minimum time ZE105 stores a minimum unit of time in which the switching of the corresponding program is performed per unit of switching during a normal time, except in an emergency, such as an interruption.

In this manner, when the time required for switching to the corresponding program is shorter than the transition time to an objective power status, a change in power status can be suppressed.

Figure 19:
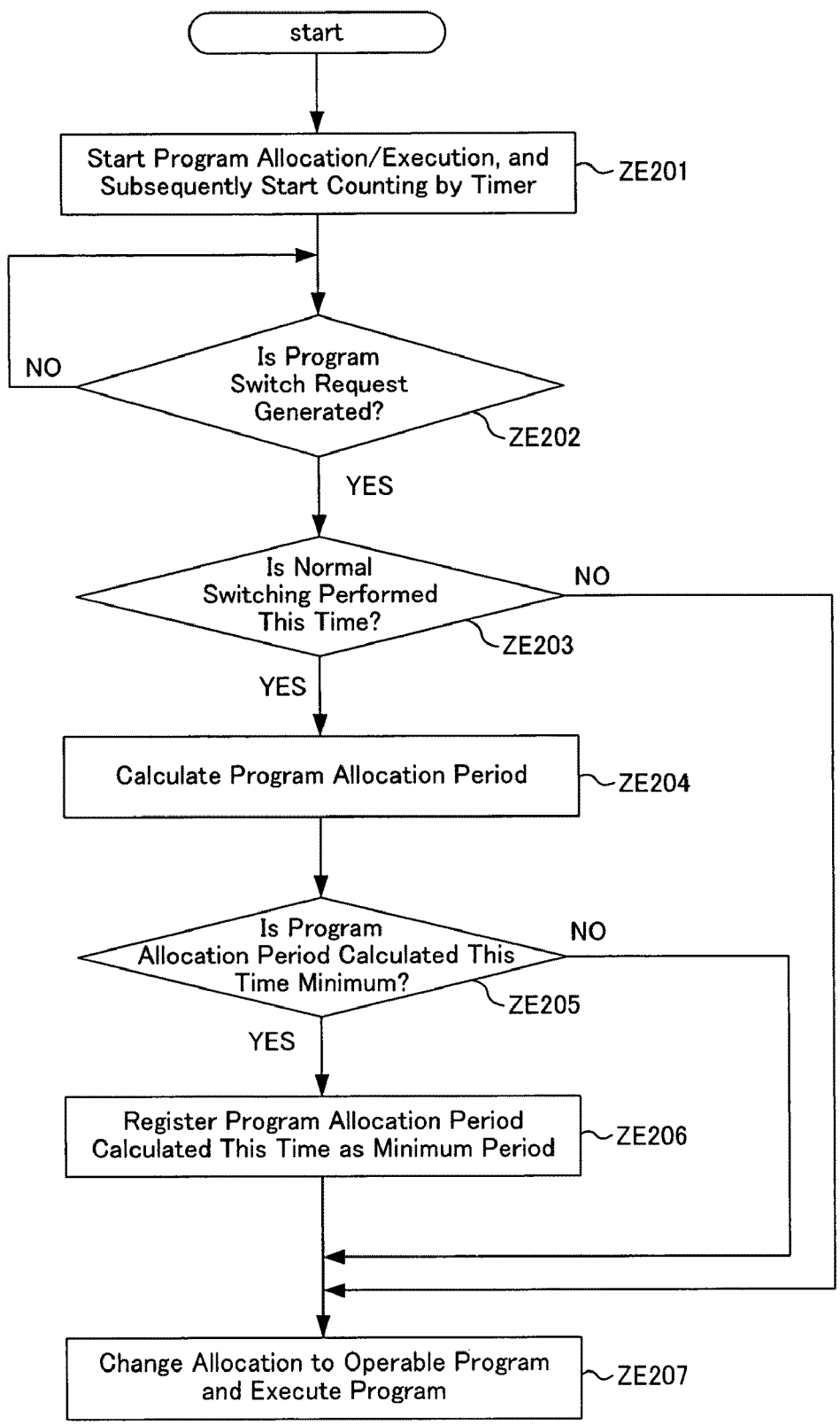
FIG. 19 is a flow chart showing an example of procedures for calculating a normal minimum time.

FIG. 19 shows procedures for calculating the normal minimum time ZE105.

In the procedure ZE201, the measurement of a program allocation period using a timer is initiated after program switching. In the procedure ZE201, a method which newly initializes the timer and performs counting or a method which records the timer value at the initiation of the program using a shared timer normally operating may be used appropriately.

In the procedure ZE202, processing is awaited till a switch to a new program.

After program switching is detected in the procedure ZE202, it is determined in the procedure ZE203 whether the program switching performed this time is normal switching or emergency switching due to an interruption or the like. When the program switching performed this time is not normal switching, the calculation and recording of the minimum time ZE105 using the program allocation period measured this time is not performed. As a result, it is possible to avoid influence exerted in a special case where the program switching is not switching during a normal program operation.

After the program switching performed this time is determined as normal switching in the procedure ZE203, the program allocation period is calculated in the procedure ZE204. When a new timer is initialized, the timer value at the time of the initialization is used. When the shared timer, normally operating, is used, the allocation period is calculated by subtracting the recorded timer value at the initiation of the program from the current timer value.

In the procedure ZE205, a comparison is made between the normal minimum time stored in the power control information holding register ZD204 and the program allocation period calculated this time in the procedure ZE204 described above and, in the procedure ZE206, the smaller value is stored as the normal minimum time in the corresponding field of the power context storage device ZA105.

In the subsequent procedure ZE207, program switching procedures are performed.

Sixth Embodiment

Figure 20:
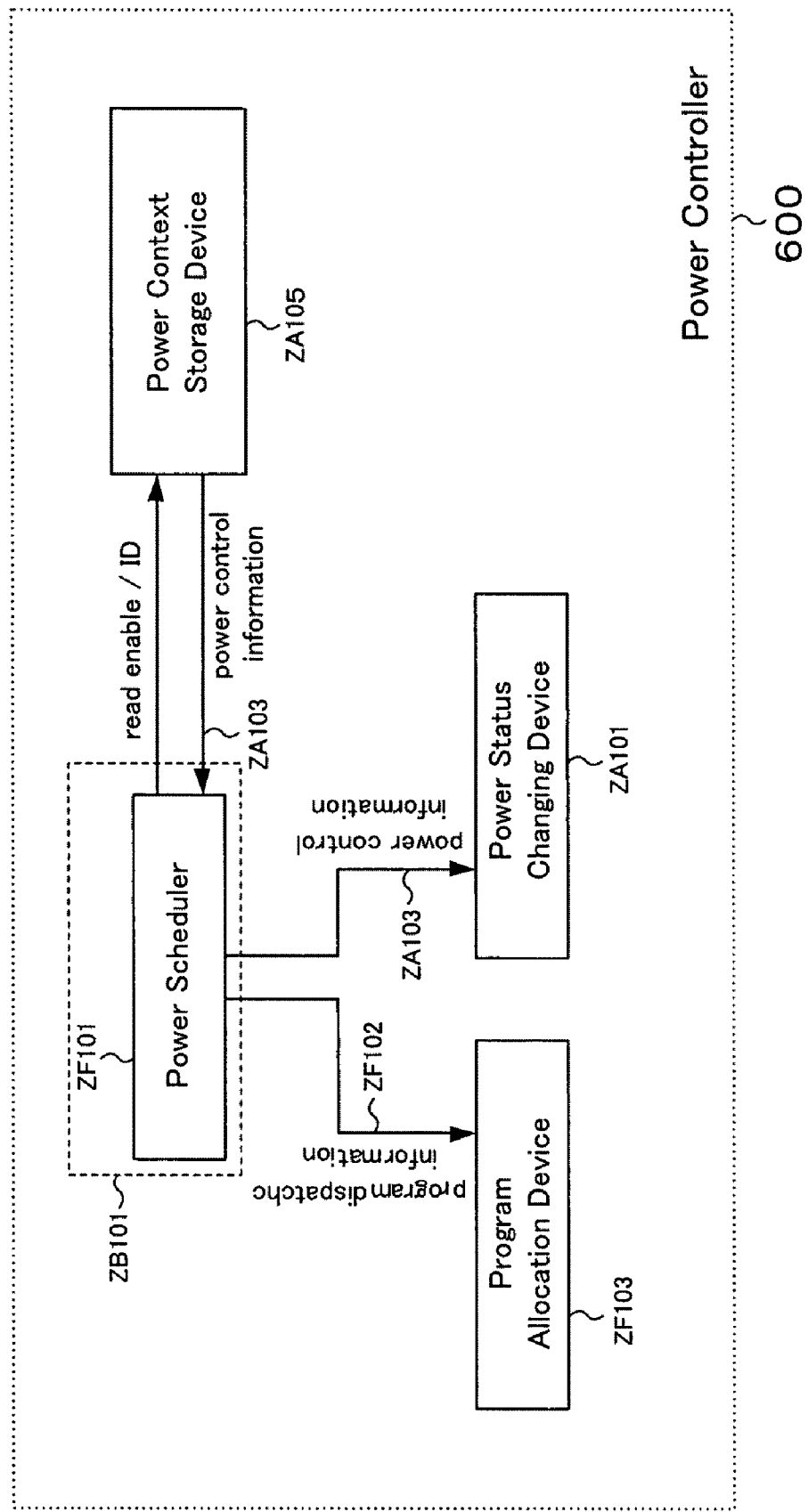
FIG. 20 is a block diagram showing a structure of a power controller according to a sixth embodiment of the present invention.

FIG. 20 is a block diagram showing a structure of a power controller 600 according to the sixth embodiment. The power controller 600 may be provided either inside the microprocessor 1000 or outside the microprocessor 1000, similarly to the power controllers 100 and 200 shown in FIGS. 1 and 7.

The power context reference device ZB101 includes a power scheduler ZF101. The power scheduler ZF101 acquires the power control information ZA103 in accordance with the identification number of the program from the power context storage device ZA105, performs calculation for a power status change based thereon, supplies the power control information ZA103 to the power status changing device ZA101, and supplies program allocation information ZF102 to a program allocation device ZF103.

The power status changing apparatus ZA101 performs a power change for the microprocessor 1000 based on the supplied power control information ZA103.

The program allocation device ZF103 allocates the program identified with the supplied program allocation information ZF102 to the microprocessor 1000.

Figure 21:
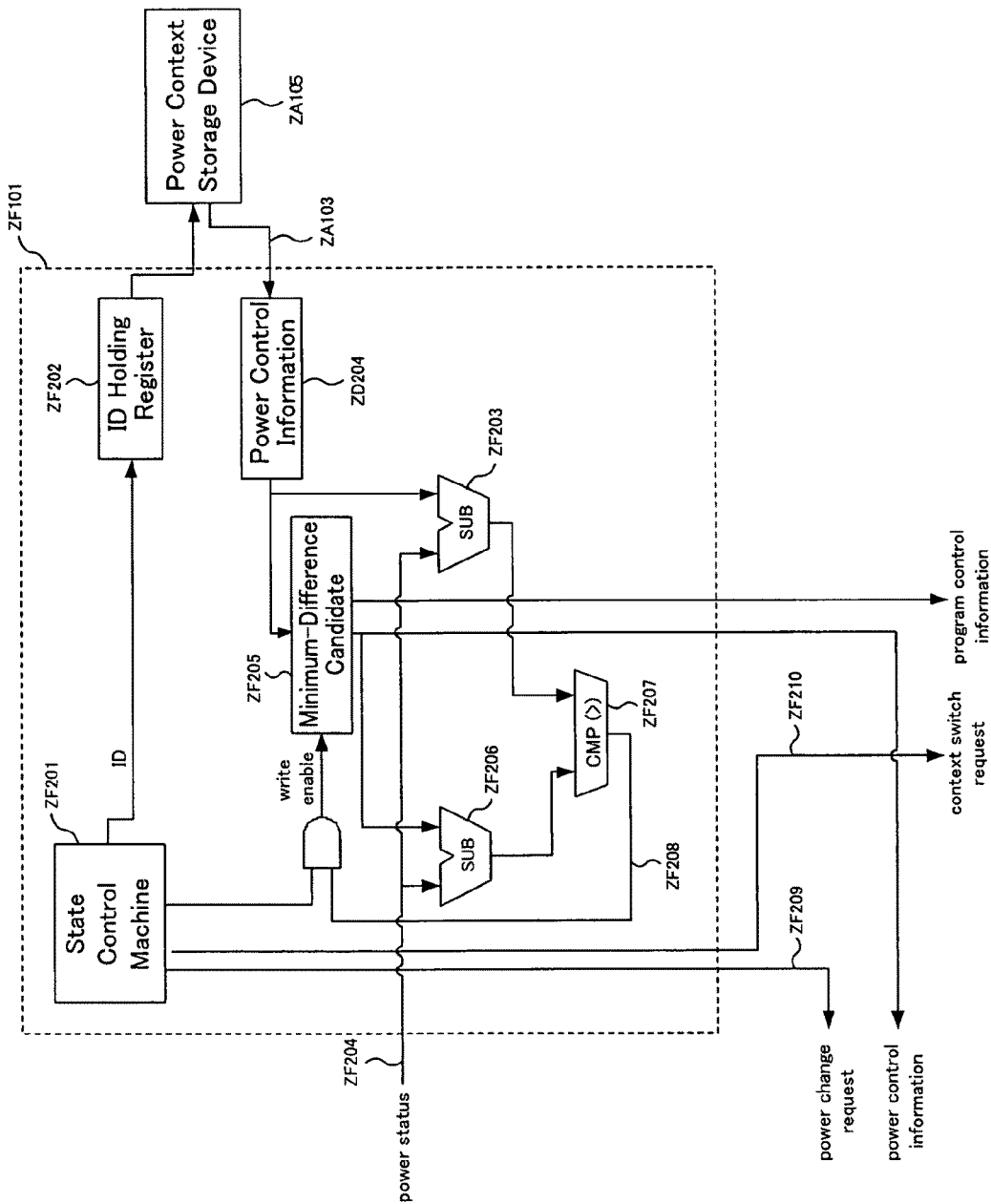
FIG. 21 is a view showing an example of a detailed structure of a power scheduler.

FIG. 21 shows an example of the internal structure of the power scheduler ZF101.

The power scheduler ZF101 supplies the identification number of each of allocatable programs to the power context storage device ZA105 via an ID holding register ZF202 by using the state control machine ZF201 having information on the program to be allocated to the microprocessor 1000 to perform a control operation for allocation, receives the power control information ZA103, and stores the power control information ZA103 in the power control information holding register ZD204.

A subtractor ZF203 calculates the difference between the power control information ZA103 outputted from the power control information holding register ZD204 and the power status ZF204 of the microprocessor 1000. When a supplied voltage (power source voltage) is assumed as the power control information, the voltage difference is outputted.

Likewise, a subtractor ZF206 calculates the difference between the power status ZF204 and a minimum-difference candidate holding register ZF205.

A comparator ZF207 makes a comparison between an output of the subtractor ZF203 and an output of the subtractor ZF206 and asserts a write request ZF208 when the output value of the subtractor ZF203 is smaller.

After a logical product (AND) between the write request ZF208 and a timing adjustment signal from the state control machine ZF201 is calculated, the write request ZF208 is issued to the minimum-difference candidate holding register ZF205. The minimum-difference candidate holding register ZF205 stores the power control information ZA103 at that time as a new minimum-difference candidate.

By performing the foregoing procedure with respect to the program identification number as an allocation candidate, the minimum-difference candidate holding register ZF205 can store the program identification number having the smallest difference value with the current power information and the power status control information ZA103.

Upon the completion of the retrieval of the program in the state control machine ZF201, a power change request ZF209 and a program switch request ZF210 are asserted and issued as a request for a power change and a request for a program change to the power status changing device ZA101 and the program allocation device ZF103, thereby changing the power and the status of program allocation.

Figure 22:
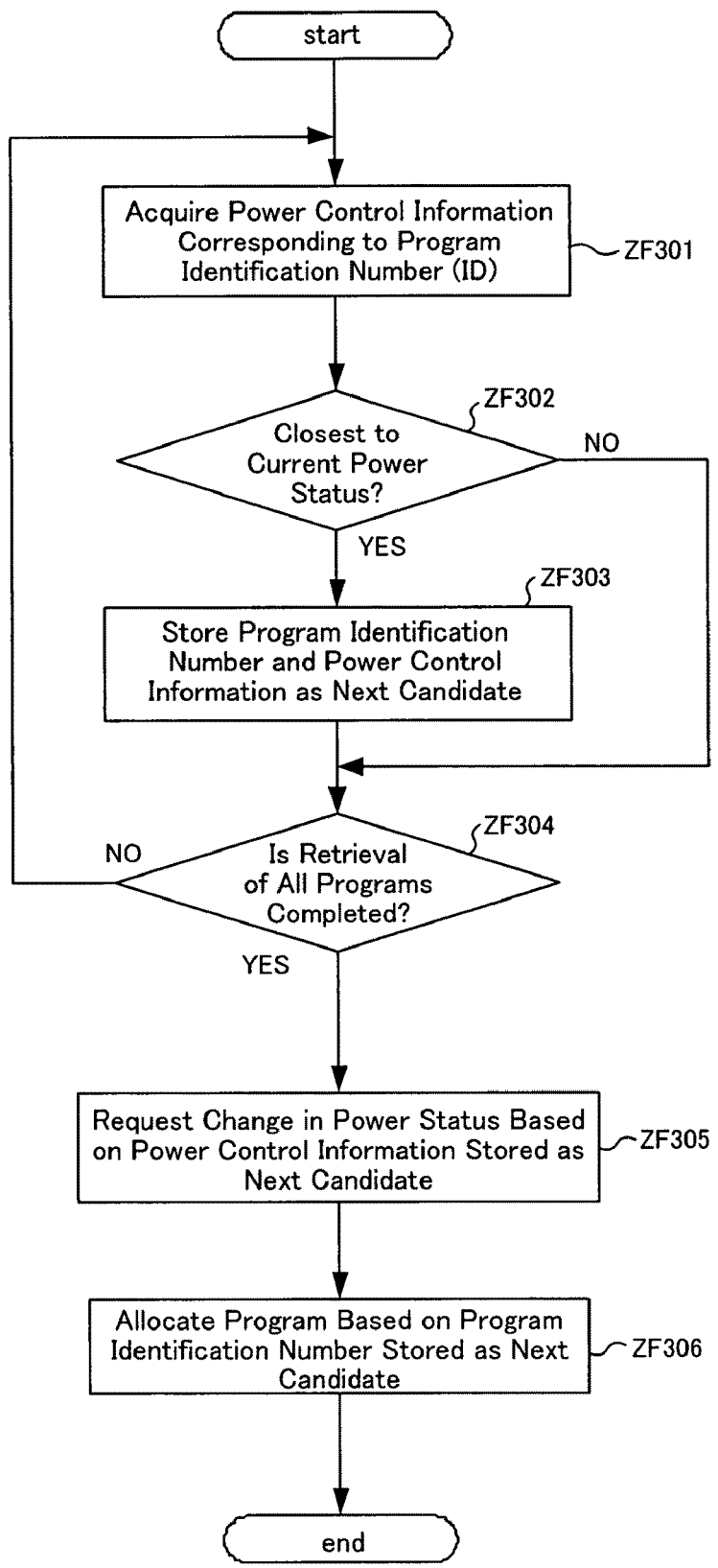
FIG. 22 is a flow chart for illustrating operation procedures of the power controller according to the sixth embodiment.

FIG. 22 shows an example of procedures performed in the present embodiment.

In the procedure ZF301, the power control information ZA103 in accordance with the identification number of the program to be subsequently allocated is acquired.

Next, in the procedure ZF302, it is examined by comparison whether or not the power value in the power control information ZA103 is closest to the current power status value ZF204. When the power value in the power control information ZA103 is closer, the corresponding program identification number and the power control information ZA103 are stored as a candidate for subsequent program allocation in the minimum-difference candidate holding register ZF205 in the procedure ZF303.

By the procedure ZF304, it is verified whether or not a minimum-difference comparison has been made with respect to all the program identification numbers. When the comparative retrieval of all the programs has been completed, a power status change is requested by the procedure ZF305 as a program to be subsequently allocated of the power status changing device ZA101, based on the content of the minimum-difference candidate holding register ZF205. In the procedure ZF305, a request for allocation of the program to be subsequently allocated is given to the program allocation device ZF103 based on the content of the minimum-difference candidate holding register ZF205.

It is to be noted that the procedures ZF305 and ZF306 may be switched to each other, depending on the mounting method.

Figure 23:
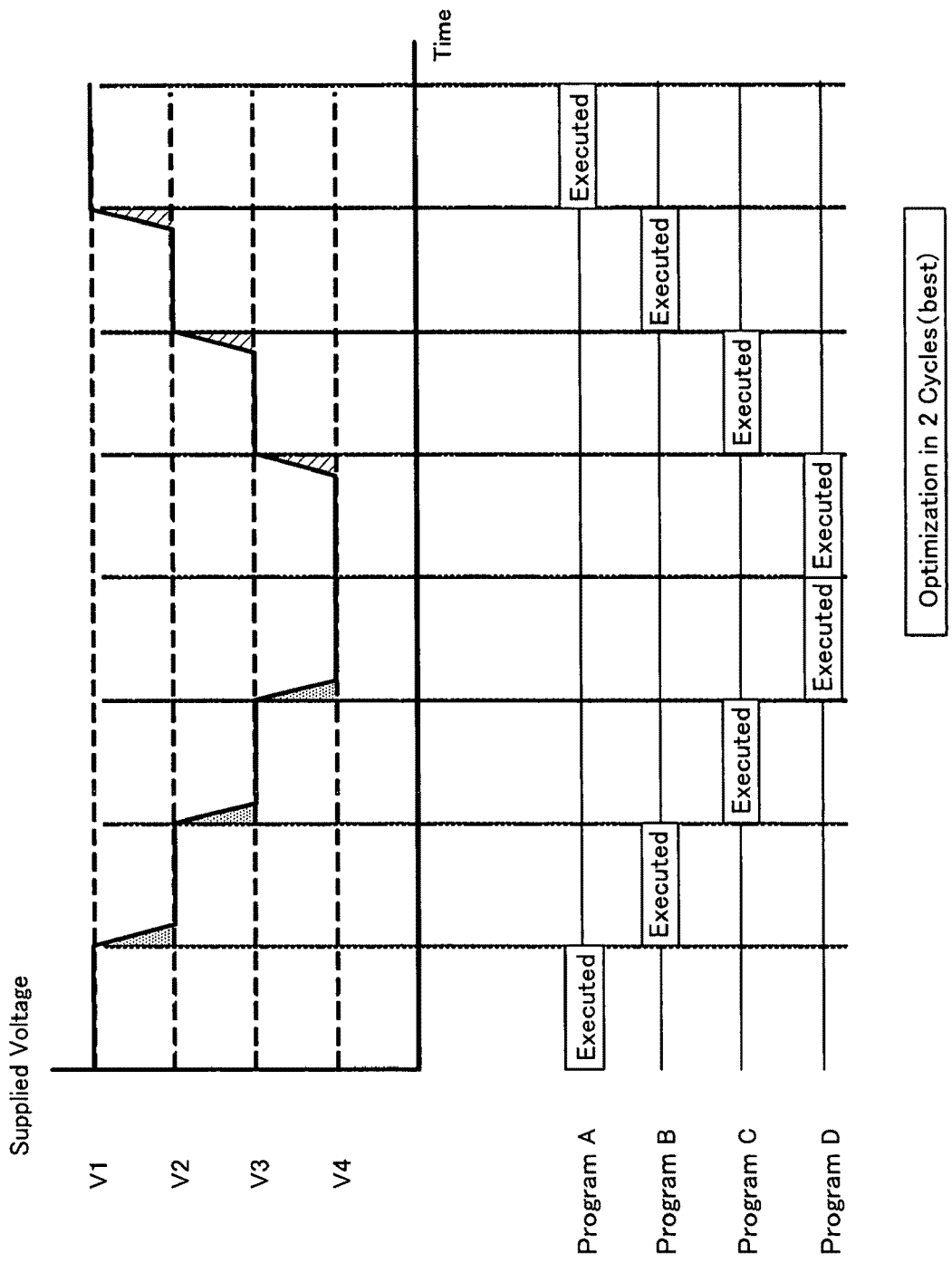
FIG. 23 is a view showing operation timings for the power controller according to the sixth embodiment.

FIG. 23 shows operation timings in the present embodiment.

During the execution of the program A, the power scheduler ZF101 retrieves a program having the smallest difference with the current power status (which is the voltage state herein) from among the allocatable programs B, C, and D. The power scheduler ZF101 determines that the program B has the minimum power difference and notifies the program allocation device ZF103 of the program B as the next program switching target, while notifying the power status changing device ZA101 of a power status change.

Likewise, the programs C and D are also retrieved at the respective times and the program allocation and the power changes are performed at appropriate times.

After the sequence of allocatable programs A to D are executed in a general manner, the programs A to D are newly recognized again by the scheduler as candidates for program allocation. During the execution of the program D, which is the final in one cycle, the power scheduler ZF101 determines that the program with the second smallest power difference is the program D through comparison between the power statuses and allocates the program D.

During the continued execution of the program D, the program C having the minimum power status difference is similarly selected as a candidate for subsequent allocation. In this case, as shown with the timings in FIG. 23, it is also possible to change the power status before switching to the program C by using the power preliminary control device ZC101 shown in the third embodiment and thereby suppress performance degradation.

Seventh Embodiment

Figure 24:
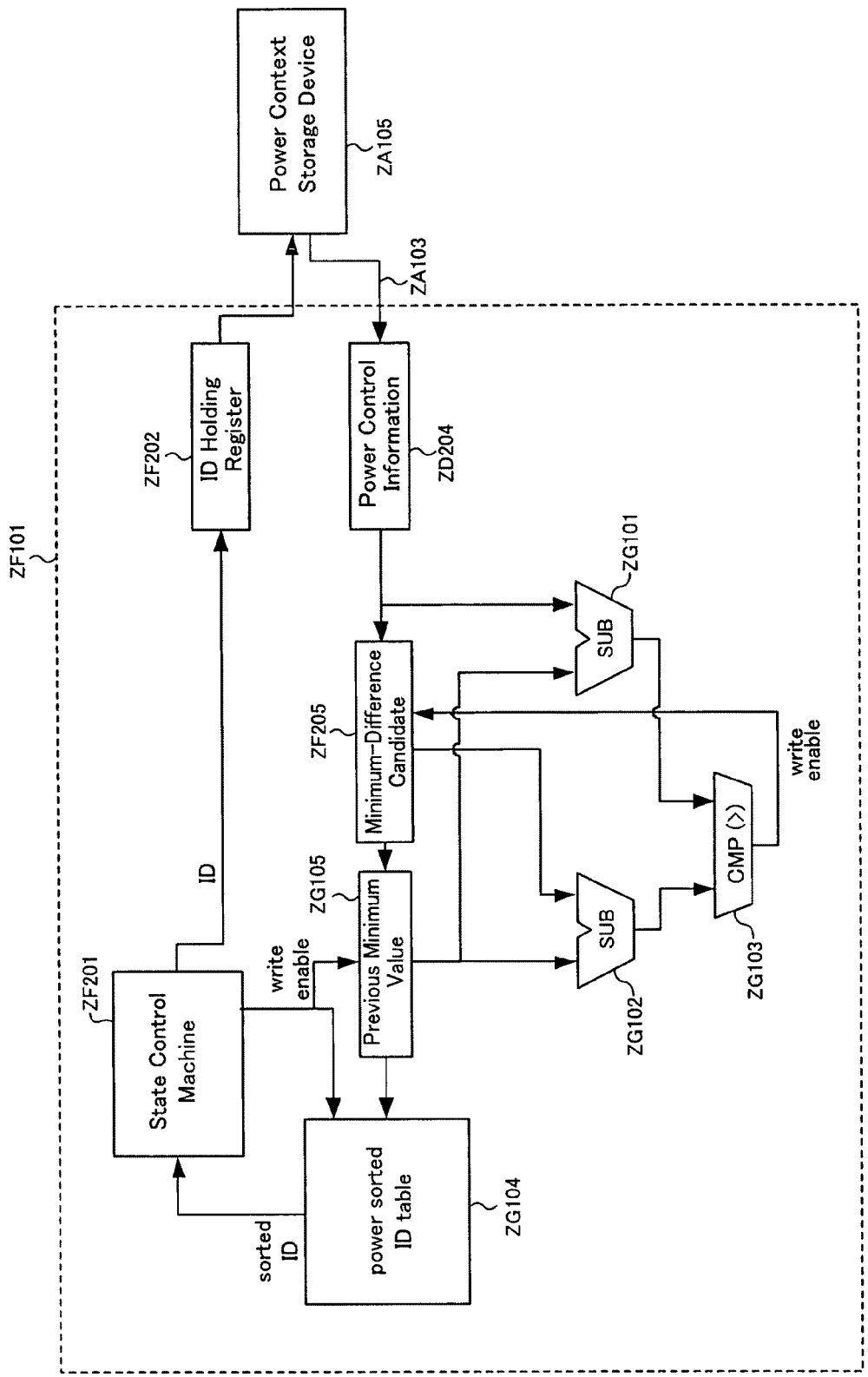
FIG. 24 is a view showing an example of a detailed structure of a power scheduler.

FIG. 24 shows another example of the internal structure of the power scheduler ZF101.

The power scheduler ZF101 supplies the identification number of each of allocatable programs to the power context storage device ZA105 via the ID holding register ZF202 by using the state control machine ZF201 having information on the program to be allocated to the microprocessor 1000 to perform the control operation for allocation, receives the power control information ZA103, and stores the power control information ZA103 in the power control information holding register ZD204.

A subtractor ZG101 calculates the difference between a previous minimum value register ZG105 for holding the minimum difference previously determined and the power control information ZA103.

Likewise, a subtractor ZG102 calculates the difference between the previous minimum value register ZG105 for holding the minimum difference previously determined and the minimum-difference candidate holding register ZF205 for holding the current minimum difference.

A comparator ZG103 makes a comparison between the results from the subtractors ZG101 and ZG102. When the value in the subtractor ZG101 is smaller, the comparator ZG103 issues a write request to the minimum-difference candidate holding register ZF205 so that the minimum-difference candidate holding register ZF205 records the power control information ZA103 currently being retrieved.

When the retrieval of the programs allocatable to the microprocessor 1000 is completed in a general manner, the state control machine ZF201 performs a control operation for writing the content of the minimum-difference candidate holding register ZF205 in the previous minimum value register ZG105 and then performs a control operation for writing the content of the previous minimum value register ZG105 in a rearranged program table ZG104.

By the foregoing procedure, the program having the smallest power difference can be extracted and the program having the second smallest power difference is subsequently extracted. In this manner, the extraction of the programs having the progressively larger power differences is continued. Consequently, the program identification information is recorded in the rearranged program table ZG104 in the order of the programs having progressively larger power differences. It will be easily understood that, by changing a comparison method, the programs can also be rearranged in order of decreasing power differences. It is also possible to perform rearrangement by a software process, nor by a hardware process.

Finally, the state control machine ZF201 issues the power-control-status change request ZA103 and the program allocation request ZF102 to the power status changing device ZA101 and the program allocation device ZF103 in accordance with the order of the programs in the rearranged program table ZG104 and performs a power status change and program switching.

Eighth Embodiment

Figure 25:
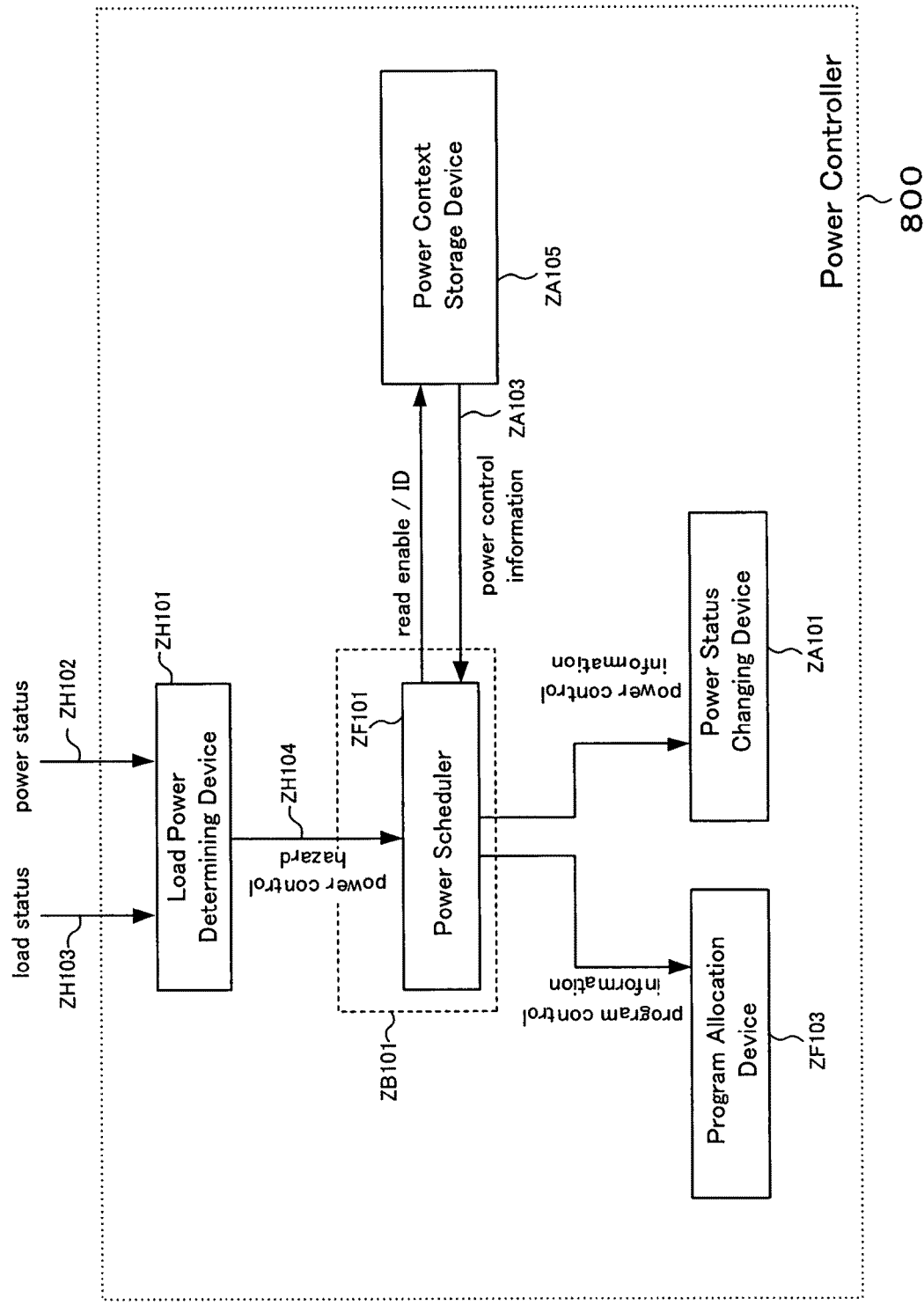
FIG. 25 is a block diagram showing a structure of a power controller according to an eighth embodiment of the present invention.

FIG. 25 is a block diagram showing a structure of a power controller 800 according to the eighth embodiment. The power controller 800 may be provided either inside the microprocessor 1000 or outside the microprocessor 1000, similarly to the power controllers 100 and 200 shown in FIGS. 1 and 7.

The power context reference device ZB101 includes the power scheduler ZF101. The power scheduler ZF101 acquires the power control information ZA103 in accordance with the identification number of the program from the power context storage device ZA105, performs calculation for a power status change based thereon, supplies the power control information ZA103 to the power status changing device ZA101, and supplies program allocation information ZF102 to a program allocation device ZF103.

The power status changing apparatus ZA101 performs a power change for the microprocessor 1000 based on the supplied power control information ZA103. The program allocation device ZF103 allocates the program identified with the supplied program allocation information ZF102 to the microprocessor 1000.

Further, a load power determining device ZH101 receives the power status ZH102 and load status ZH103 of the microprocessor 1000. As a result of performing a comparative determination process between the power status ZH102 and the load status ZH103, when the load power determining device ZH101 determines that the current combination of the power status and the load status could cause the misoperation of the microprocessor 1000, it outputs a power control hazard notification ZH104 to the power scheduler ZF101. This also implies a program switch request to the power scheduler ZF101. On receiving the power control hazard notification ZH104, the power scheduler ZF101 retrieves a program allocatable in the current power status and notifies the program allocation device ZF103 of program allocation. If possible, the power scheduler ZF101 further issues a power status change notification for lowering power to the power status changing device ZA101.

Figure 26:
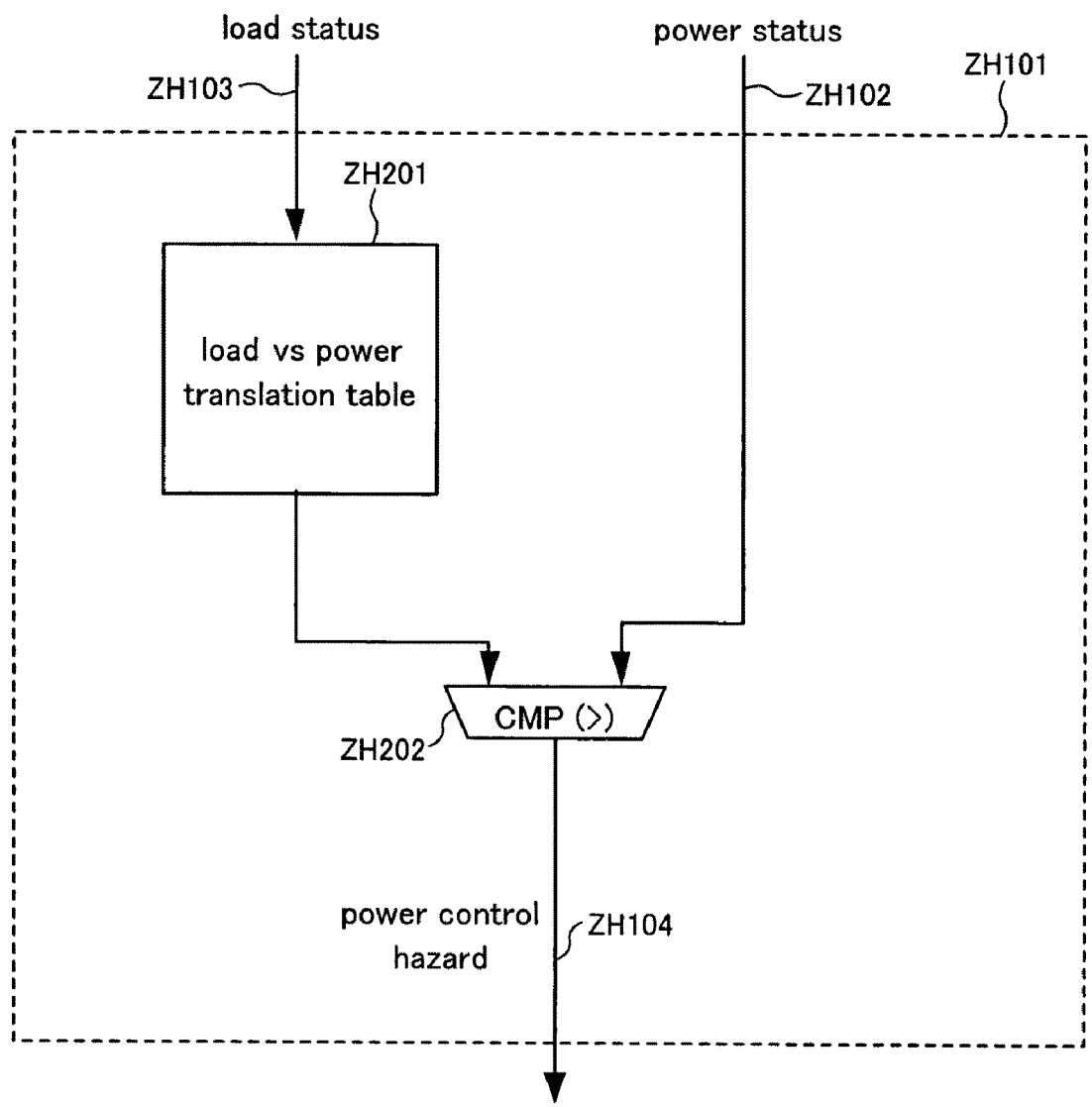
FIG. 26 is a view showing an example of a detailed structure of a load power determining device.

FIG. 26 shows an example of the internal structure of the load power determining device ZH101.

A load power conversion table ZH201 outputs an operable power status value in accordance with the load status ZH103 inputted thereto. The load status ZH101 shows the current operating state of the microprocessor 1000 and includes the number of memory accesses, the number of executed instructions, and an operation frequency. For example, when the number of memory accesses, the number of executed instructions, and the operation frequency are assumed as the load status ZH101, a power source voltage value which allows the microprocessor 1000 to operate without incurring a misoperation in each of the execution load statuses is outputted. It will be easily understood that the table ZH201 may also be composed of a rewritable register or memory or of a combinational logic.

A comparator ZH202 makes a comparison between an output of the load power conversion table ZH201 and the current power status ZH102 of the microprocessor 1000 and reports the power control hazard ZH104 to the power scheduler ZF101 when the current power status is smaller.

The power scheduler ZF101 allows another program to be executed without causing a waiting status for allowing the power status to shift to a state which does not cause the misoperation and can prevent the degradation of the system performance due to a waiting operation.

In this manner, in the microprocessor 1000 using a power control method based on the load status also, it is possible to perform power control with reduced performance degradation without causing the misoperation of the microprocessor 1000.

Figure 27:
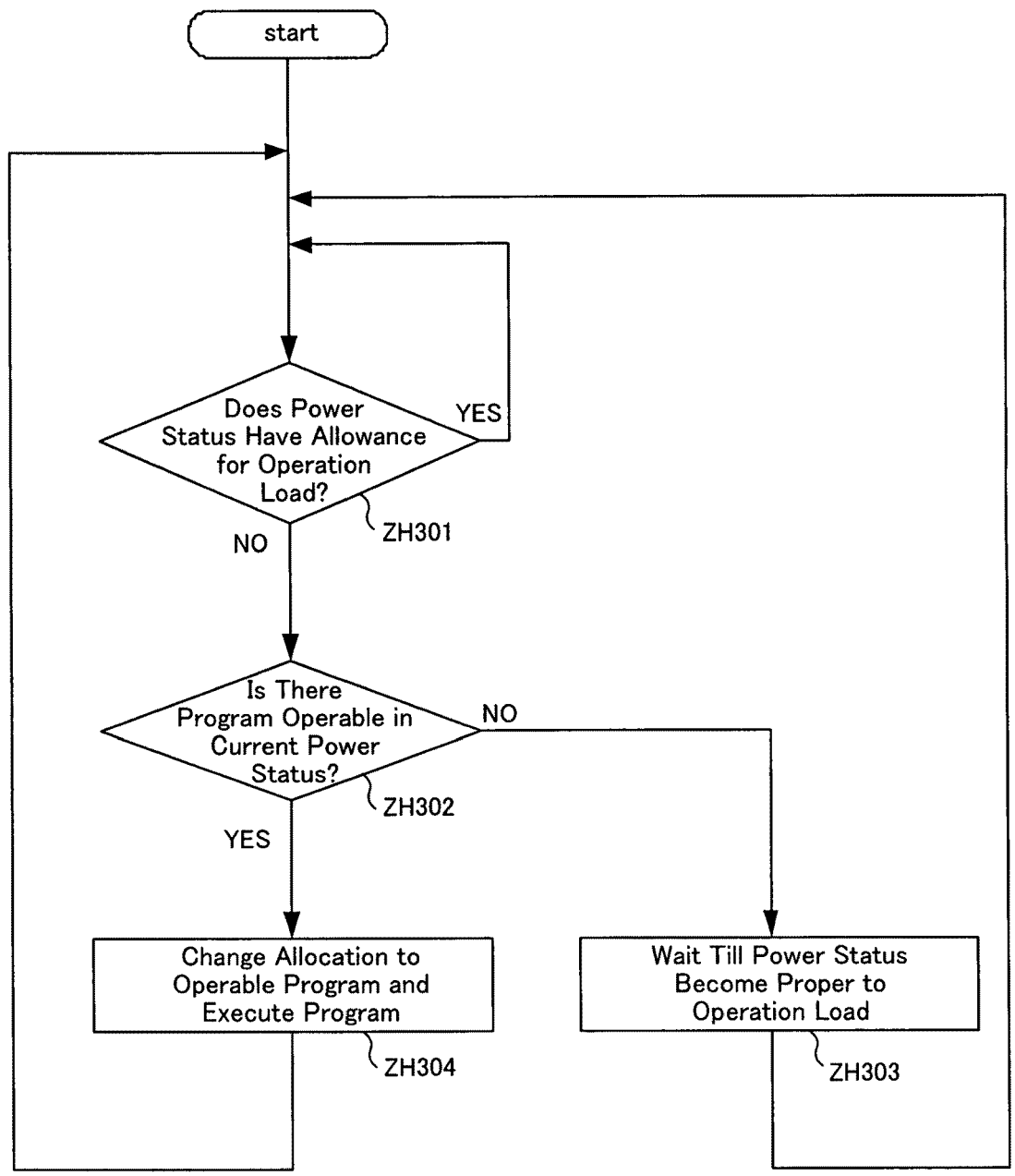
FIG. 27 is a flow chart for illustrating operation procedures of the power controller according to the eighth embodiment.

FIG. 27 shows an example of procedures performed in the present embodiment.

In the procedure ZH301, a comparison is made at all times between the power status and load status of the microprocessor 1000 to watch the microprocessor 1000 and prevent it from approaching a state which causes the misoperation. When the power status has no more allowance, the whole process flow advances to the procedure ZH302 where it is retrieved whether there is a program operable in the current power status.

When there is no program operable in the current power status, a waiting operation is performed in the procedure ZH303 till the power status becomes proper with respect to the operation load.

When there is a program operable in the current power status, allocation is changed to the operable program in the procedure ZH304 to sustain the execution of the microprocessor 1000.

For a program determined by the determination of the current power status to possibly cause the misoperation, it is also possible to update the content of the power context storage device ZA105 with a safe value to enable a safer operation at the subsequent program allocation.

For example, a consideration is given to the case where, in the power context storage device ZA105, the voltage information included in the power control information for the corresponding program is recorded as 0.9 V. In this case, when the corresponding program has caused a power control hazard, a safer operation is enabled at the subsequent program allocation by rewiring the foregoing voltage information to a safer power condition of 1.0 V.

The dynamic change in power condition can be easily combined with a power allocation hit/miss determining mechanism as shown in, e.g., the fourth embodiment.

Ninth Embodiment

Figure 28:
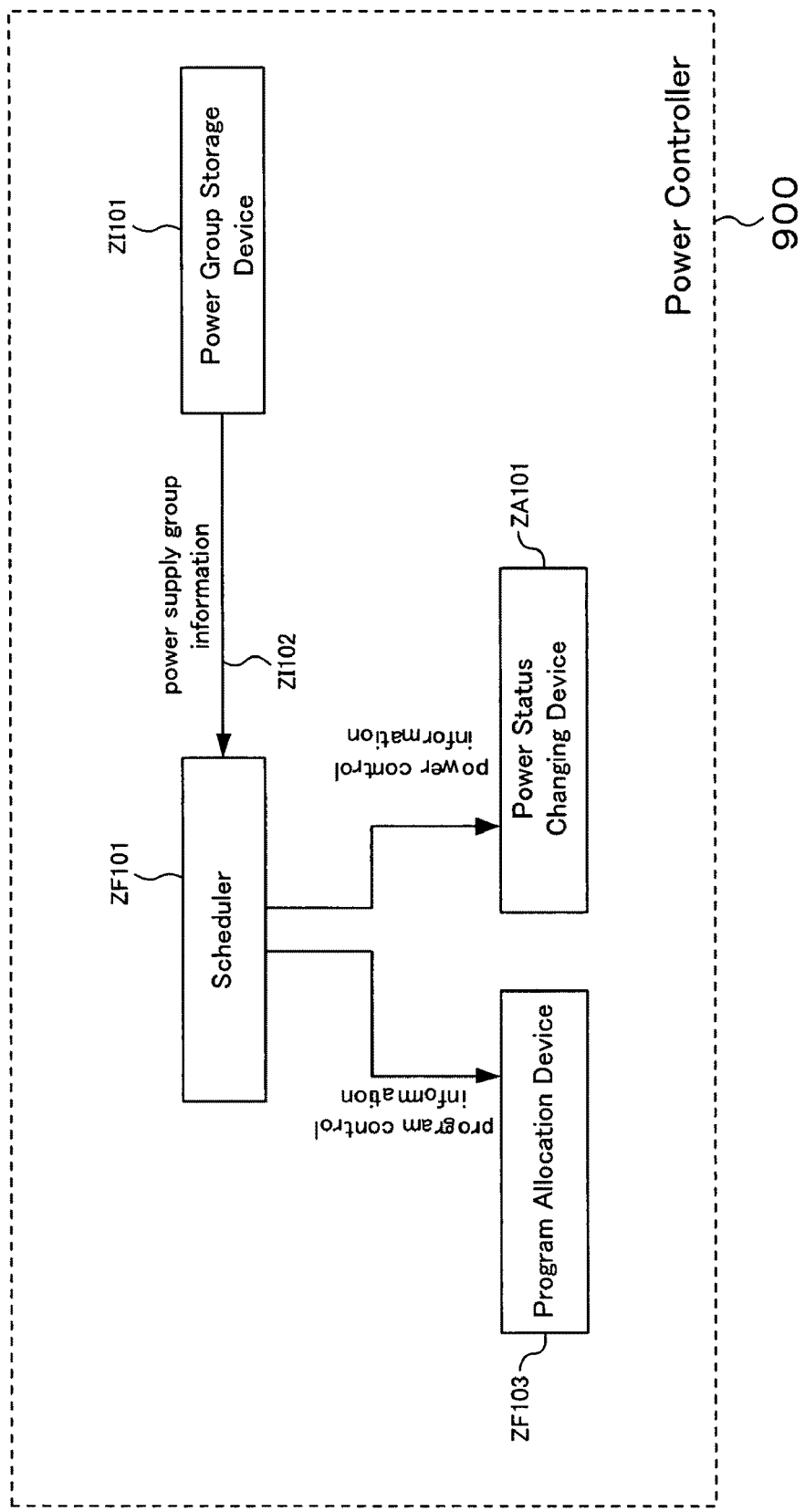
FIG. 28 is a block diagram showing a structure of a power controller according to a ninth embodiment of the present invention.
Figure 32:
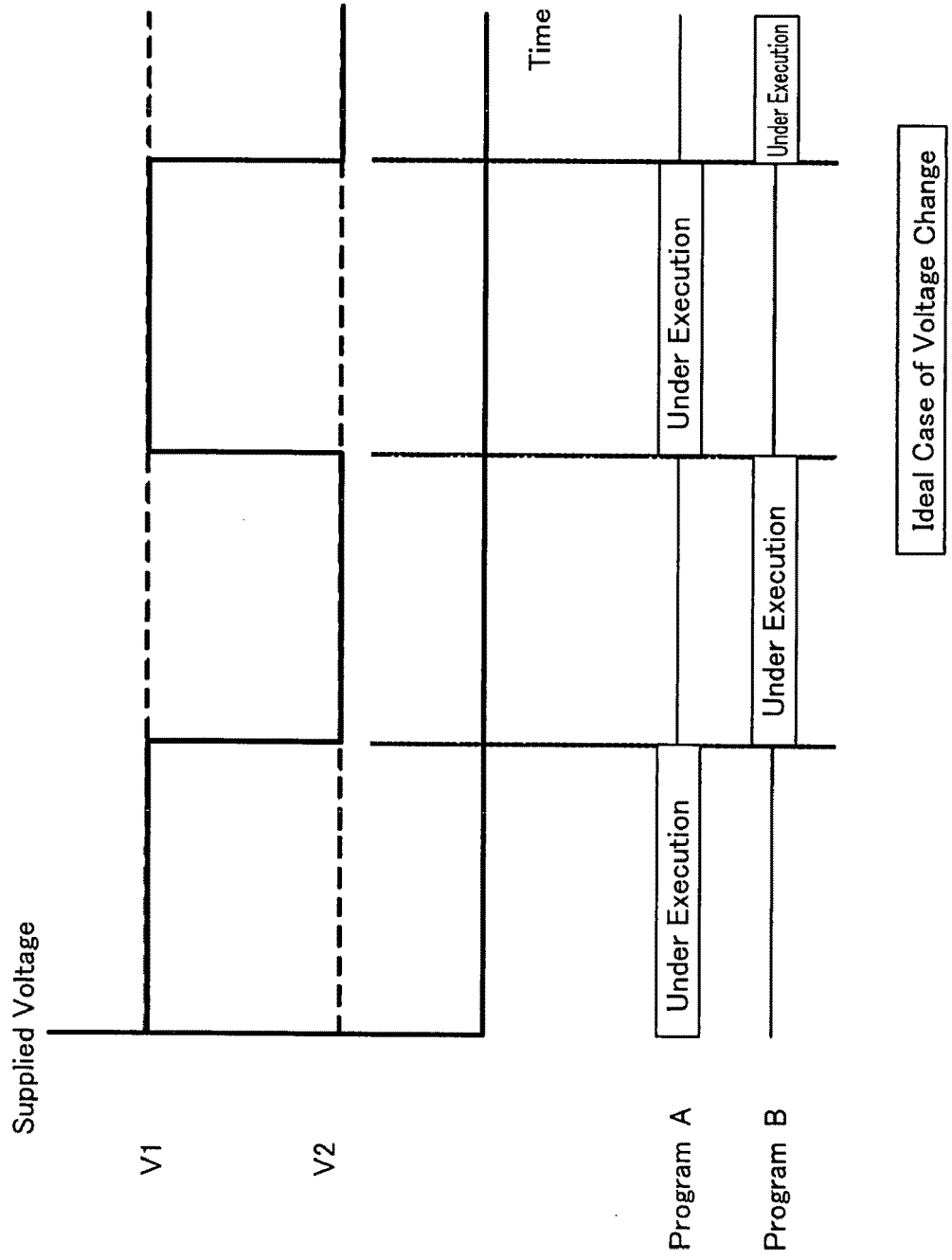
FIG. 32 is a view showing an example of an ideal voltage change.
Figure 33:
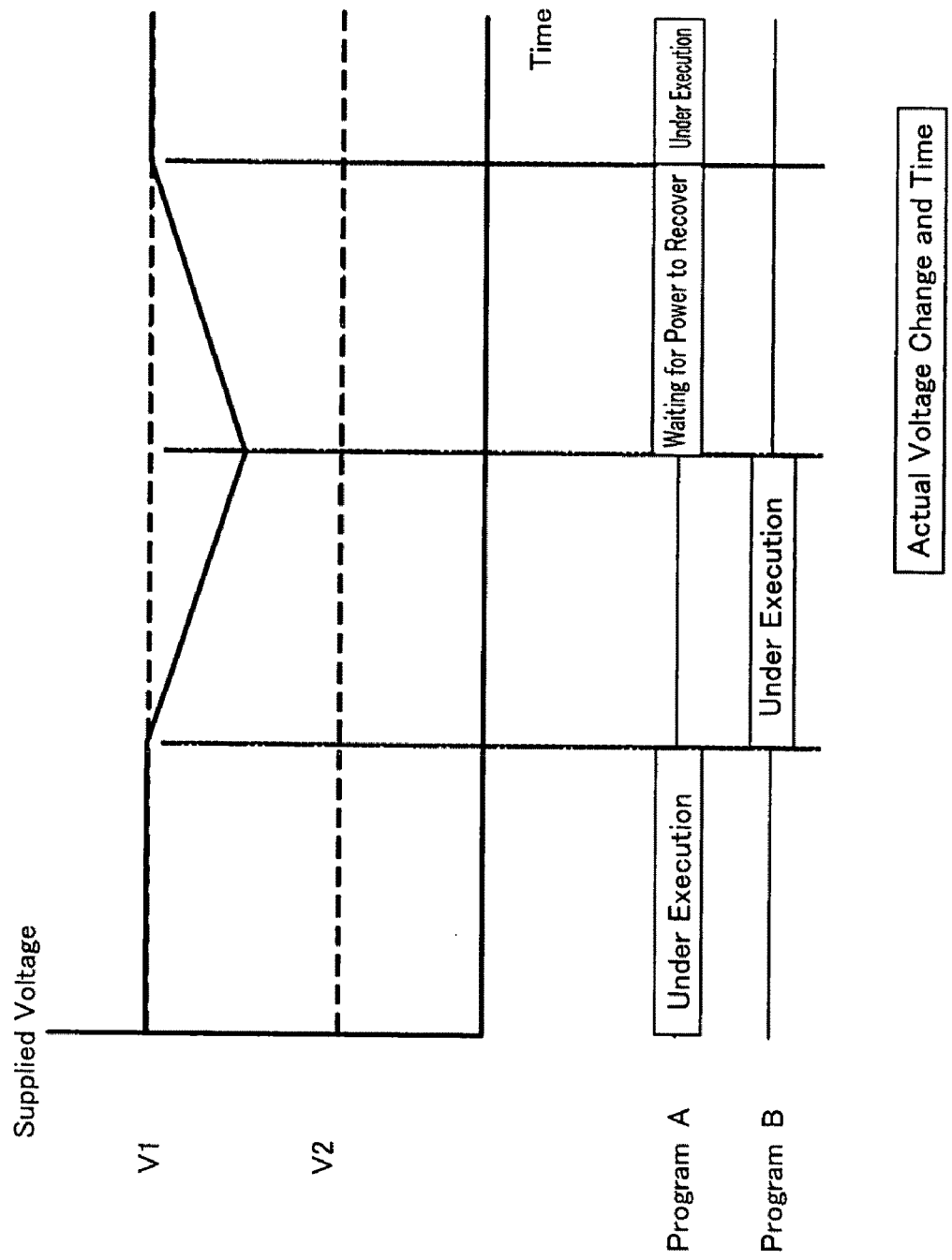
FIG. 33 is a view showing an example of a voltage change involving an actual transition time.
Figure 34:
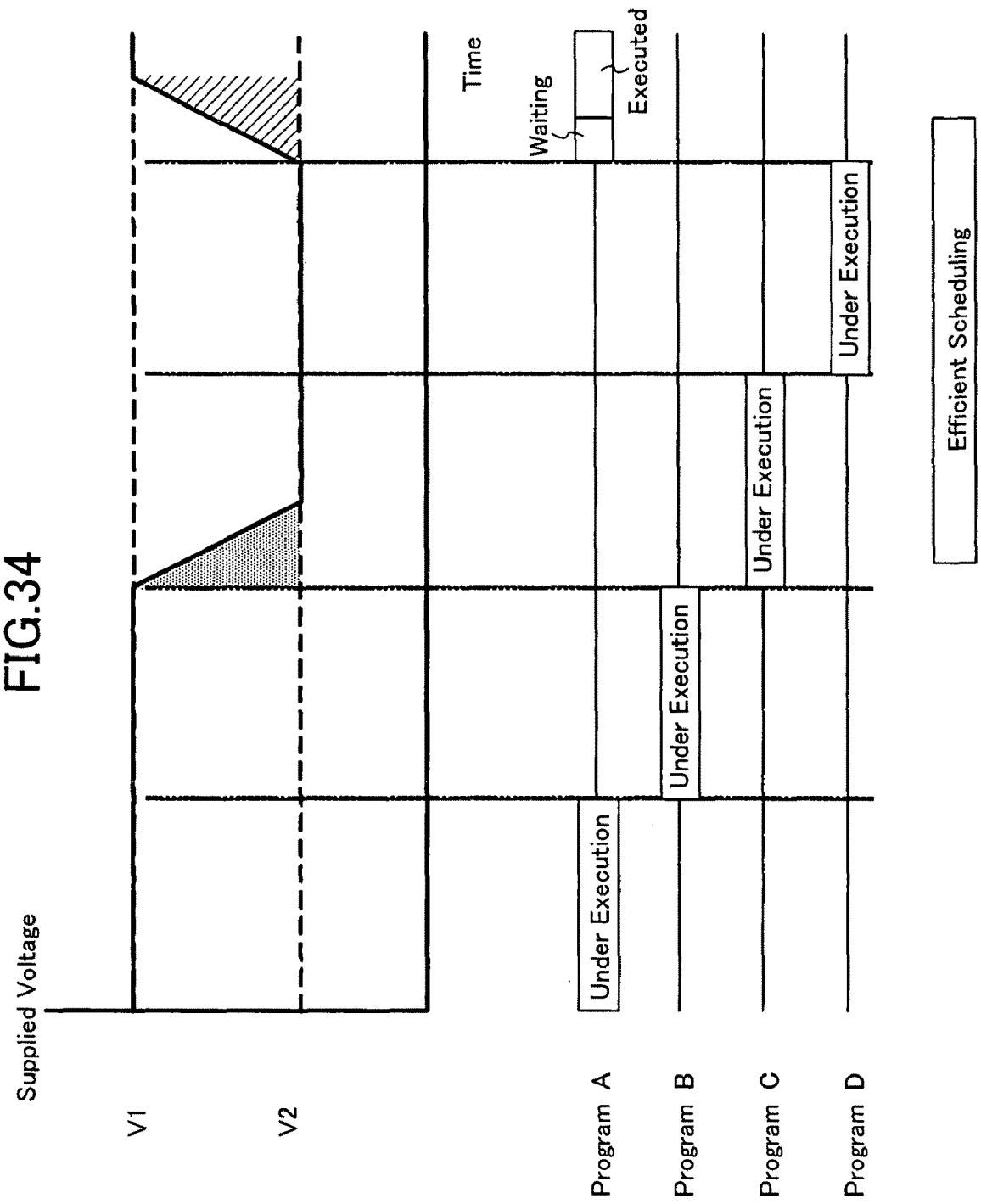
FIG. 34 is a view showing an example of efficient scheduling in terms of power consumption.
Figure 35:
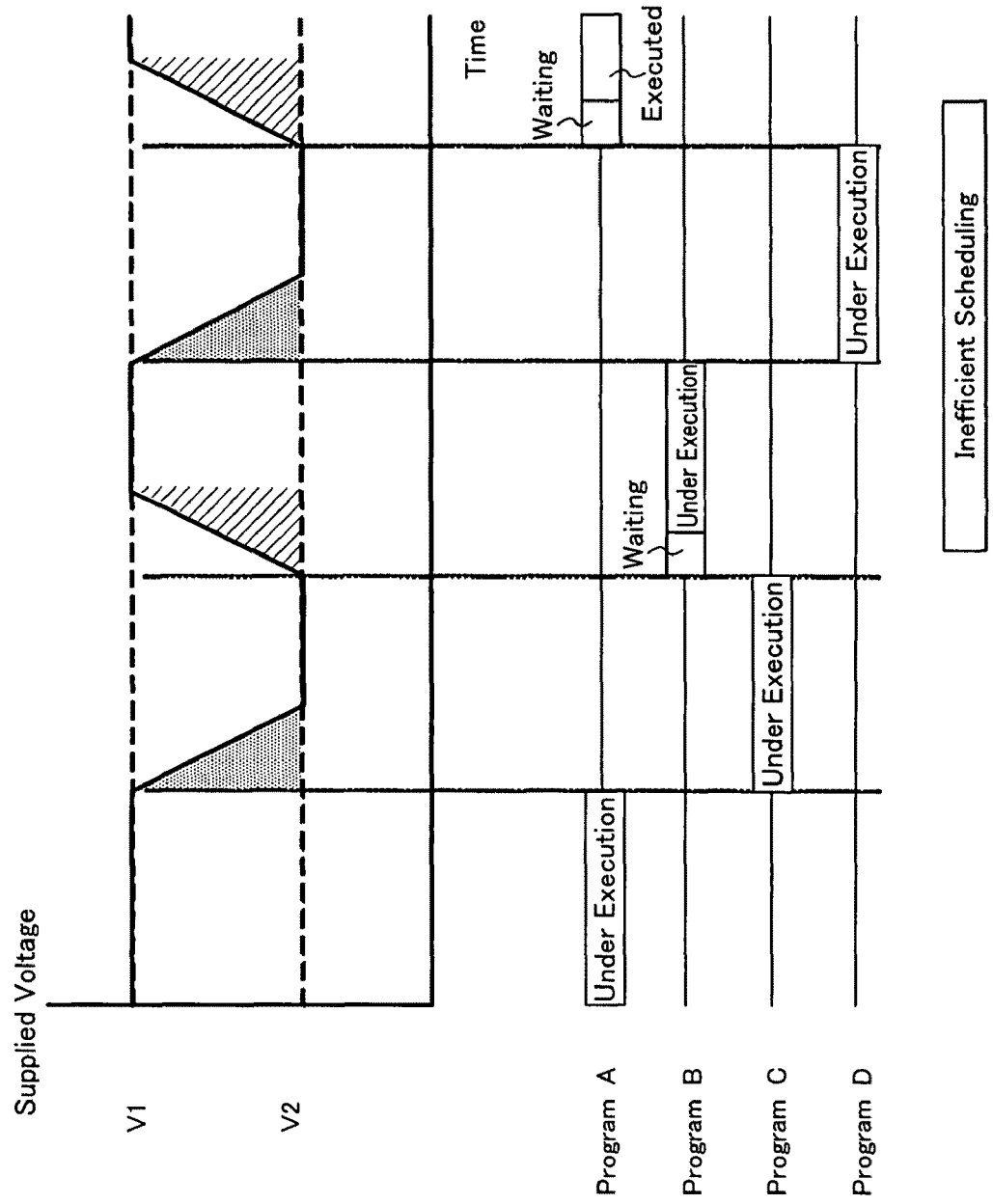
FIG. 35 is a view showing an example of inefficient scheduling in terms of power consumption.

FIG. 28 is a block diagram showing a structure of a power controller 900 according to the ninth embodiment. The power controller 900 is for implementing an efficient reduction in total power consumption during the execution of a plurality of programs without depending on the number of processors mounted in a system having a plurality of physical processors.

The power scheduler ZF101 acquires power source group information ZI102 from a power source group storage device ZI101, determines processors to which the individual programs are to be allocated based thereon, notifies the program allocation device ZF103 of information on the programs to be allocated, and notifies the power status changing device ZA101 of a power status change.

FIGS. 29(a) and 29(b) show examples of a method for storage construction for the power source group information ZI102.

FIG. 29(a) shows a method which prepares storage regions for the individual identification numbers of the physical processors in a one-to-one correspondence and shows the power source groups to which the corresponding processors belong. In the example of FIG. 29(a), the processors with the processor numbers 0 and 3 physically belong to the power source group 0, the processor with the processor number 1 belongs to the power source group 1, and the processor with the processor number 2 belongs to the power source group 2. In this method, the storage regions in accordance with the number of the physical processors are required. In this example, it is shown that the four processors are physically designed and mounted with the three power source groups and there are the three power source groups to which control operations for changing statuses can be performed independently. In this example, e.g., the power source voltages for the processors with the processor numbers 0 and 3 cannot be changed individually. Accordingly, it is advisable in reducing power consumption to allocate the programs under closer power conditions to the processors with the processor numbers 0 and 3.

FIG. 29(b) shows a method which prepares storage regions for the respective power source groups in a one-to-one correspondence and shows the corresponding power source groups to which the processors with the respective processor numbers belong. In FIG. 29(b), it is shown that the corresponding processor belongs to the corresponding power source group when a stored value is 1. Accordingly, the processors with the processor numbers 0 and 3 belong to, e.g., the power source group with the power source group number 0.

In each of FIGS. 29(a) and 29(b), the content of the stored information is the same and either of the methods is applicable in consideration of the number of the storage regions, the number of the processors, and the extensibility of the number of the power source groups.

FIGS. 30(a) and 30(b) show examples of physical layout of the plurality of physical processors and power source group storage devices. FIG. 30(a) shows the example of the structure corresponding to FIG. 29(a), in which power-source-group storage devices are provided in the respective processors. FIG. 30(b) shows the example of the structure corresponding to FIG. 29(b), in which the set of processors have a shared power-source-group storage device. Although FIGS. 30(a) and 30(b) show the examples of the structures in which the plurality of processors are mounted on the same LSI, the set of processors may also be mounted on different LSIs and additional logic portions may not be included in the examples of the structures.

In the examples described above, the processors to which the individual programs are to be allocated and executed are determined in order to efficiently reduce the total power consumption during the execution of the plurality of programs in the system having the plurality of physical processors. However, it is also possible to determine the processors to which the individual programs are to be allocated and executed in order to efficiently distribute an amount of heat generated during the execution of the plurality programs in the system having the plurality of physical processors, in accordance with the following methods.

Figure 31:
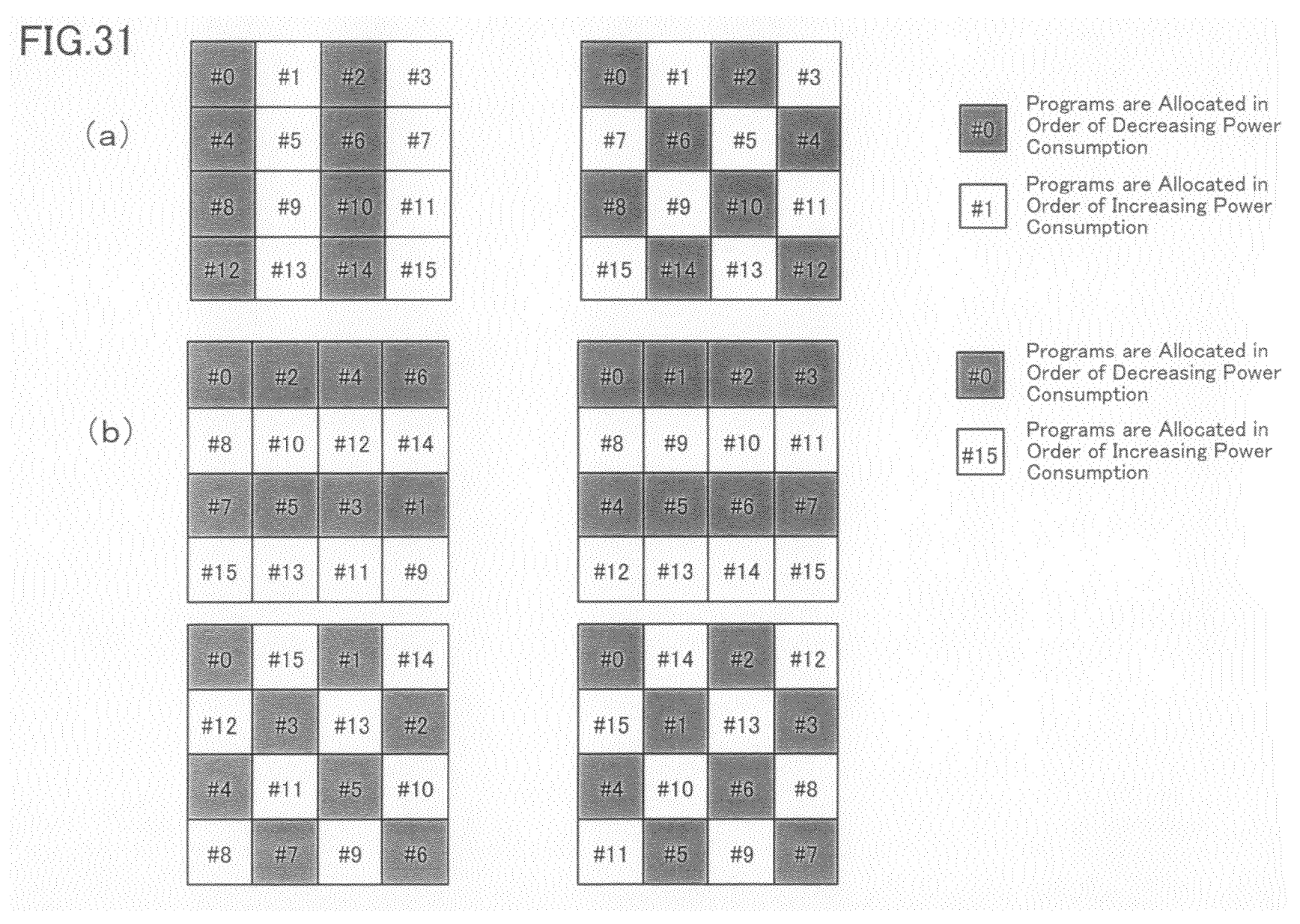

In the first method, the programs are alternately allocated as shown below based on the power status when the physical processor numbers are arranged in the same manner as conventionally arranged. In this method, as shown in FIG. 31(a), allocation is performed such that the program with the highest power is allocated to the processor #0, the program with the lowest power is allocated to the processor #1, the program with the second highest power is allocated to the processor #2, the program with the second lowest power is allocated to the processor #3, and so forth.

In the second method, the physical processor numbers are non-sequentially designed and placed. In this method, as shown in FIG. 31(b), the physical processor numbers are non-sequentially (in increments of non-fixed values) positioned in the directions of rows or columns. Then, the programs are successively allocated to the physical processor numbers in order of decreasing power consumption. Since the processor numbers are non-sequential, the programs are naturally distributed.

INDUSTRIAL APPLICABILITY

The present invention is applicable to information processors in general, including a microprocessor (such as a microcomputer, a microcontroller, or a digital signal processor) composed of a single or plurality of structures, a sequencer, a static configurational logic, and a dynamic reconfigurable logic.

What is claimed is:

1. A power controller for controlling power consumed in an information processor, the power controller comprising:
a power context storing means for storing power control information for individual programs per program basis in storage regions, the storage regions being distinguished by program identification information;
a power context reference means for referencing the power control information for a desired program in the power context storing means; and
a power status changing means for changing a status of the power consumed in the information processor based on the power control information referenced by the power context reference means, wherein:
the power context reference means includes a program scheduling means for selecting a program so that, when the program is executed, an amount of power change from a current power status becomes minimum, based on the power control information stored in the power context storing means per program basis, and allocating the selected program to the information processor.

2. A power controller for controlling power consumed in an information processor, the power controller comprising:
a power context storing means for storing power control information for individual programs per program basis in storage regions, the storage regions being distinguished by program identification information;
a power context reference means for referencing the power control information for a desired program in the power context storing means; and
a power status changing means for changing a status of the power consumed in the information processor based on the power control information referenced by the power context reference means, wherein:
the power context reference means includes a program scheduling means for rearranging programs in an order which minimizes power changes when the programs change, based on the power control information stored in the power context storing means per program basis, and allocating the rearranged programs to the information processor.

* * * * *